United States Patent
Koyanagi

(10) Patent No.: US 8,705,485 B2
(45) Date of Patent: Apr. 22, 2014

(54) WIRELESS COMMUNICATION SYSTEM, TERMINAL APPARATUS, AND COMMUNICATION METHOD

(75) Inventor: Kenichiro Koyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 483 days.

(21) Appl. No.: 12/545,185

(22) Filed: Aug. 21, 2009

(65) Prior Publication Data
US 2009/0310558 A1 Dec. 17, 2009

Related U.S. Application Data

(63) Continuation of application No. PCT/JP2007/053814, filed on Feb. 28, 2007.

(51) Int. Cl.
  H04W 16/12 (2009.01)
  H04W 16/02 (2009.01)
  H04W 72/08 (2009.01)
  H04W 16/30 (2009.01)
  H04W 72/04 (2009.01)

(52) U.S. Cl.
  CPC ............ *H04W 16/12* (2013.01); *H04W 16/02* (2013.01); *H04W 72/085* (2013.01); *H04W 16/30* (2013.01); *H04W 72/0453* (2013.01)
  USPC ........................................................ 370/330

(58) Field of Classification Search
  USPC ............................ 370/330, 343; 455/447, 552
  See application file for complete search history.

(56) References Cited

U.S. PATENT DOCUMENTS

| | | | |
|---|---|---|---|
| 7,383,057 B1* | 6/2008 | Senarath et al. | 455/522 |
| 2004/0097238 A1 | 5/2004 | Hwang et al. | |
| 2005/0181802 A1 | 8/2005 | Utakouji | |
| 2005/0271009 A1 | 12/2005 | Shirakabe et al. | |
| 2006/0212133 A1 | 9/2006 | Damnjanovic et al. | |
| 2007/0004419 A1* | 1/2007 | Ji et al. | 455/447 |
| 2007/0064666 A1* | 3/2007 | Kwun et al. | 370/343 |
| 2008/0310341 A1* | 12/2008 | Koyanagi | 370/328 |

FOREIGN PATENT DOCUMENTS

| | | |
|---|---|---|
| EP | 1418776 A1 | 5/2004 |
| EP | 2445291 A2 | 4/2012 |
| JP | 06311089 | 11/1994 |
| JP | 9506756 | 6/1997 |
| JP | 2004159345 | 6/2004 |
| JP | 2005027189 | 1/2005 |
| JP | 2005210703 | 8/2005 |

(Continued)

OTHER PUBLICATIONS

International Search Report dated Jun. 12, 2007.

(Continued)

*Primary Examiner* — Joseph Bednash
(74) *Attorney, Agent, or Firm* — Smith, Gambrell & Russell, LLP

(57) ABSTRACT

A wireless communication system includes a first base station apparatus that includes a wireless unit, which performs transmission or reception using a first frequency at a first time slot and performs the transmission or the reception using both the first frequency and a second frequency at a second time slot; and a second base station apparatus that includes a wireless unit, which performs the transmission or the reception using the second frequency at the first time slot and performs the transmission or the reception using both the first frequency and the second frequency at the second time slot.

14 Claims, 18 Drawing Sheets

(56) References Cited

FOREIGN PATENT DOCUMENTS

| | | |
|---|---|---|
| JP | 2005229350 | 8/2005 |
| JP | 2005341432 | 12/2005 |
| JP | 2006352786 | 12/2006 |
| WO | 2006011505 | 2/2006 |
| WO | WO 2006/011505 A1 * | 2/2006 ............... H04Q 7/36 |

OTHER PUBLICATIONS

Japanese Office Action dated Mar. 15, 2011 for application No. 2009-501092.

Extended European Search Report dated Nov. 30, 2012 received in Application No. 07737533.5-2412 / 2117242.

* cited by examiner

FIG.3
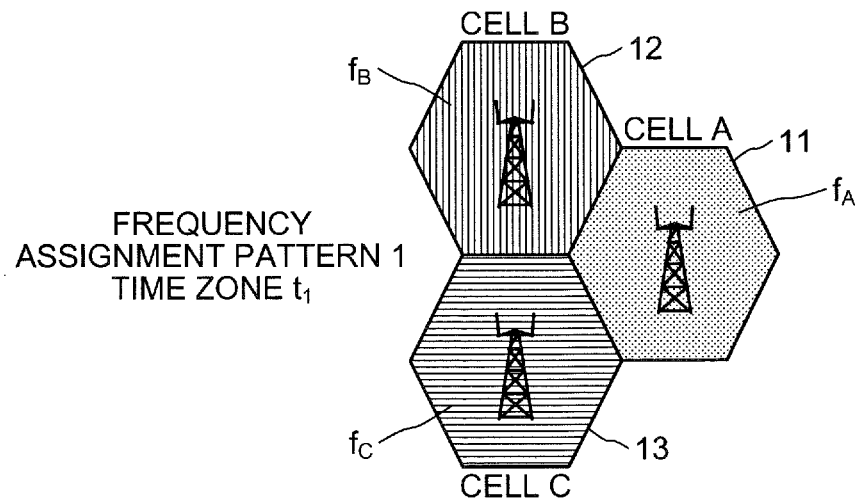
FREQUENCY ASSIGNMENT PATTERN 1
TIME ZONE $t_1$
REPEAT
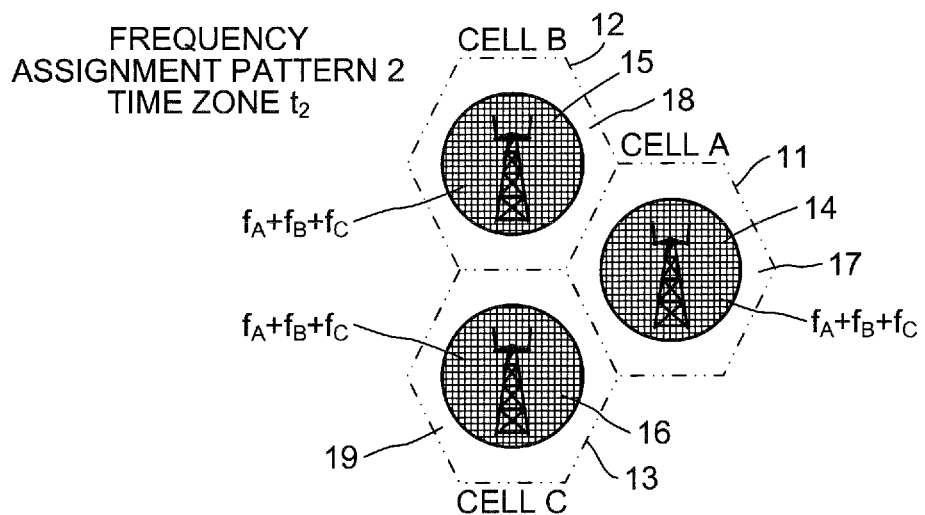
FREQUENCY ASSIGNMENT PATTERN 2
TIME ZONE $t_2$

FIG.7
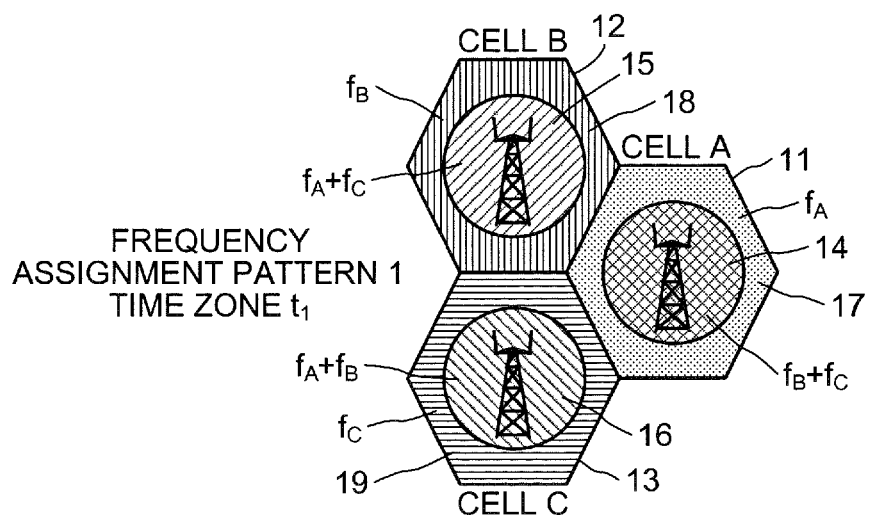
FREQUENCY ASSIGNMENT PATTERN 1
TIME ZONE $t_1$
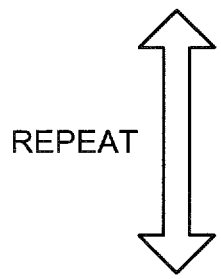
REPEAT
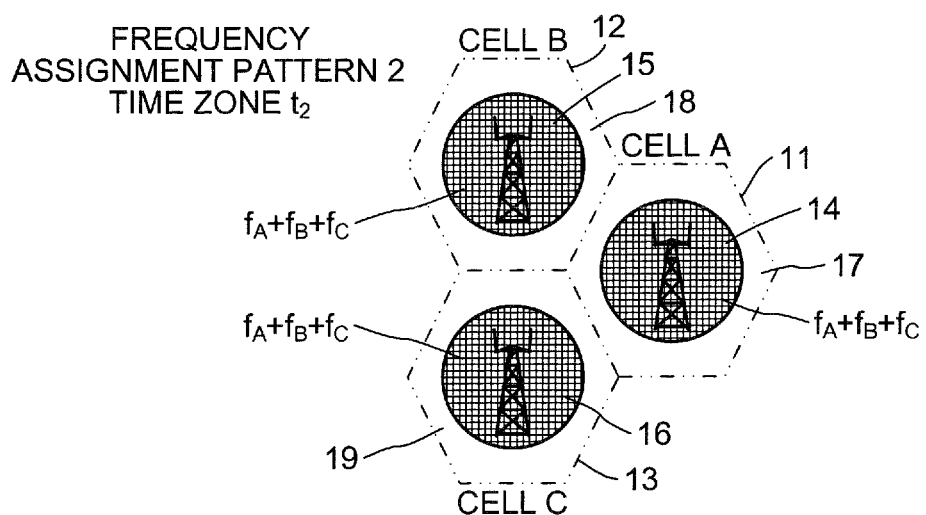
FREQUENCY ASSIGNMENT PATTERN 2
TIME ZONE $t_2$

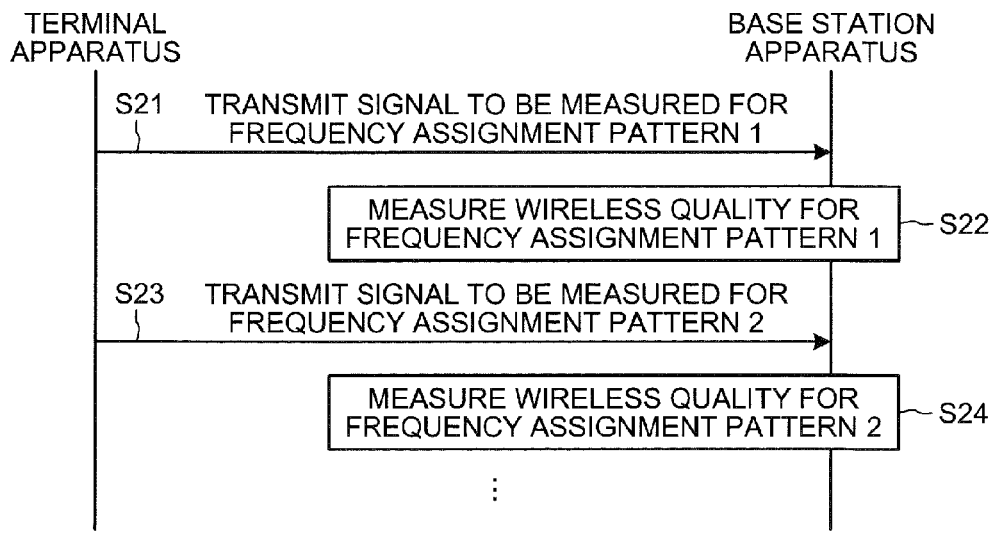
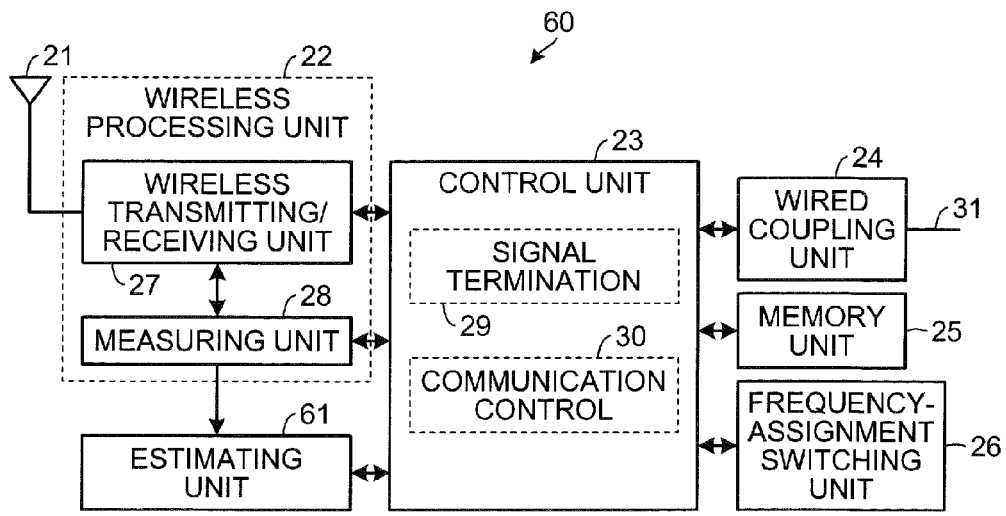

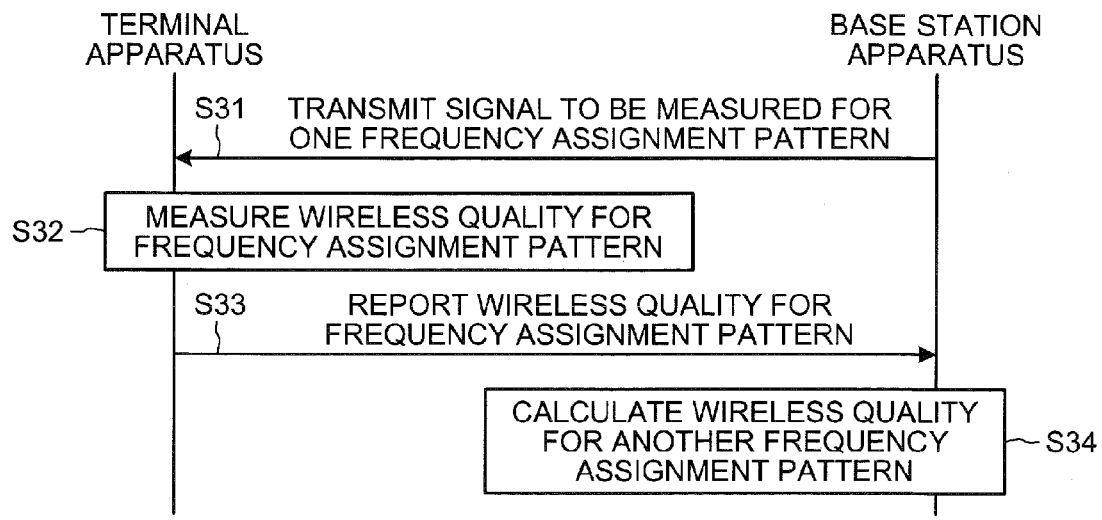
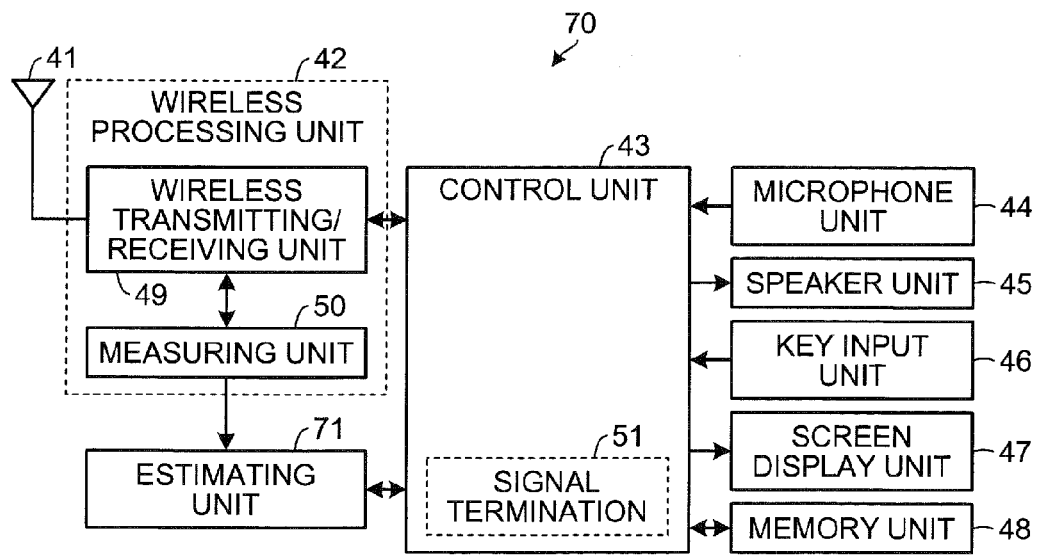

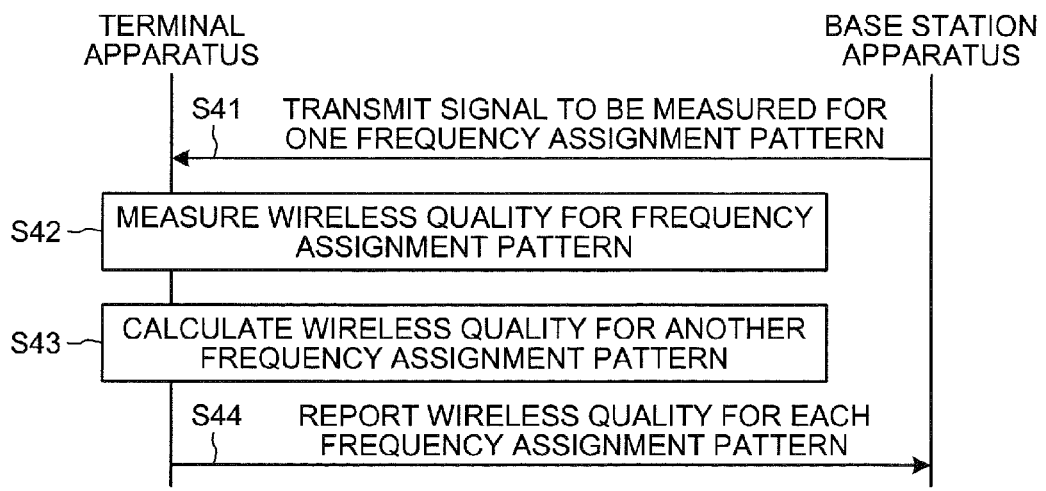
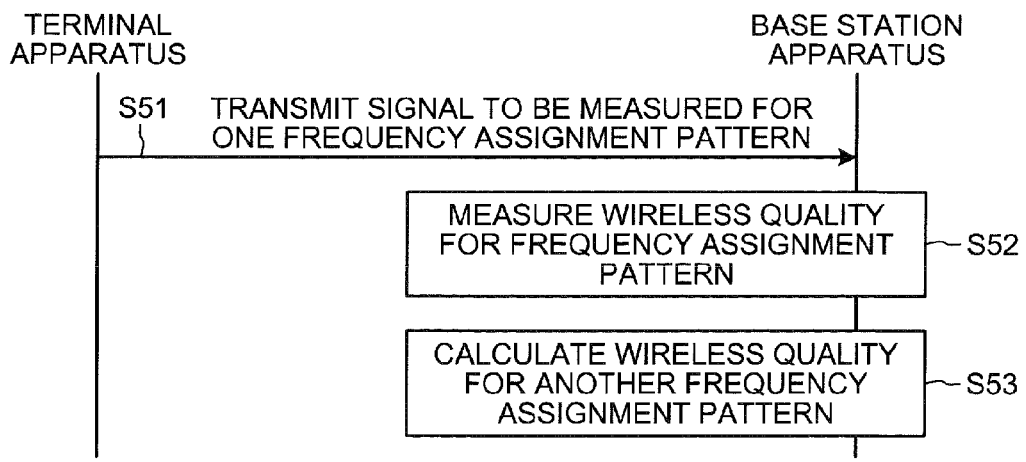

FIG.15
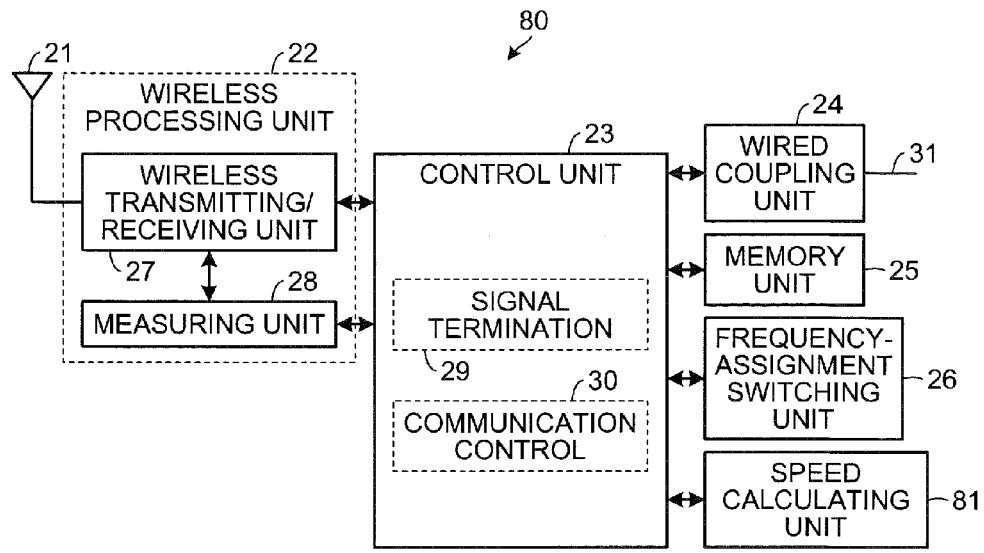
FIG.16
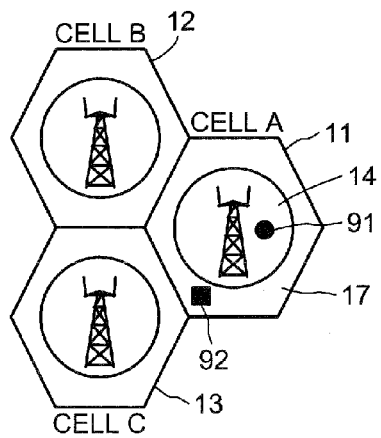
FIG.17
| TERMINAL APPARATUS | WIRELESS QUALITY (SIGNAL TO INTERFERENCE NOISE RATIO) | |
|---|---|---|
| | FREQUENCY ASSIGNMENT PATTERN 1 (TIME ZONE $t_1$) | FREQUENCY ASSIGNMENT PATTERN 2 (TIME ZONE $t_2$) |
| ● | 20 dB | 17 dB |
| ■ | 5 dB | 0 dB |
| ... | ... | ... |

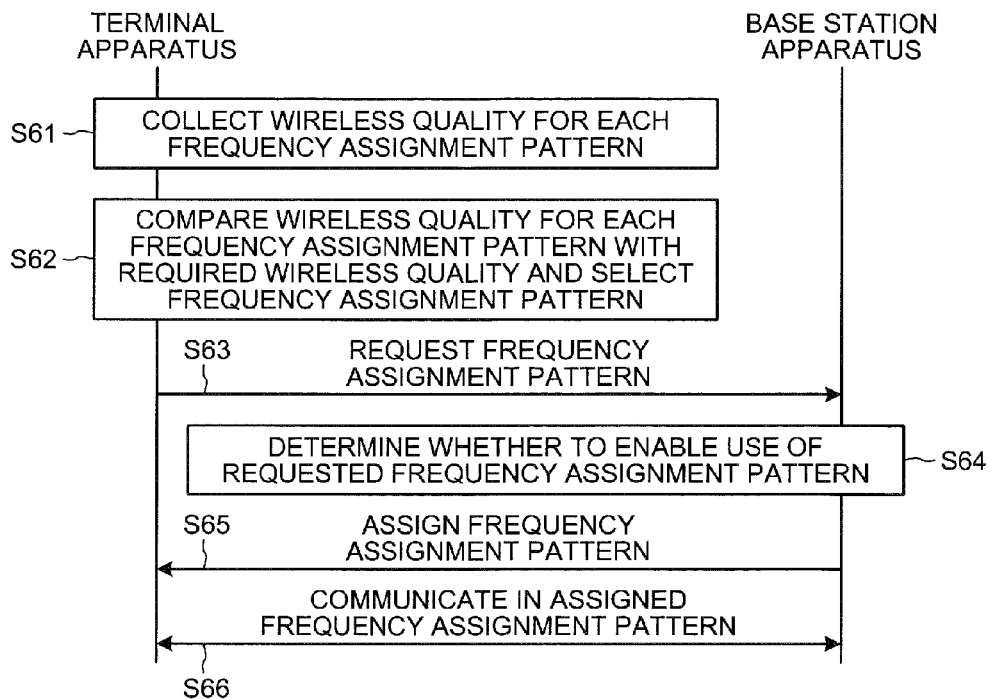
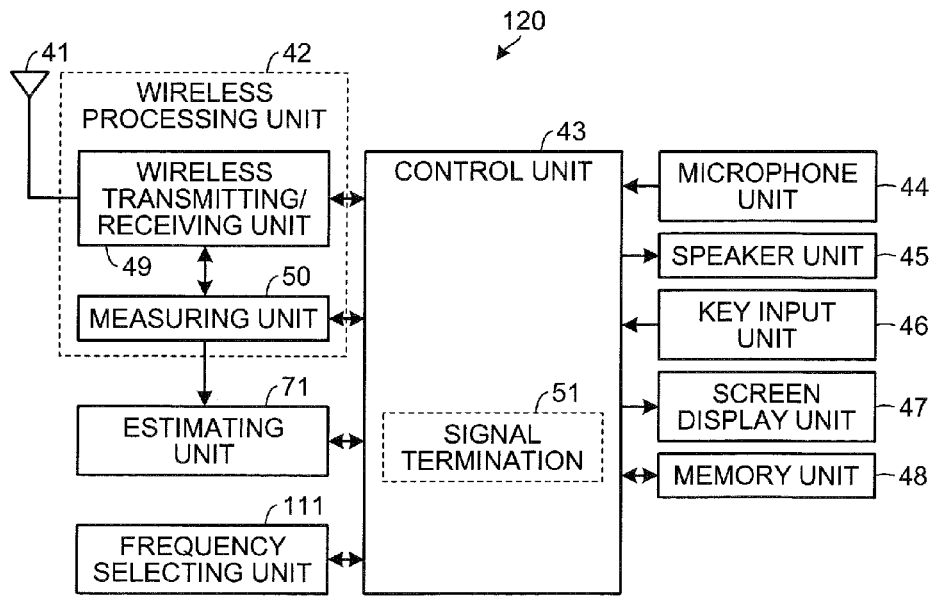

FIG. 25
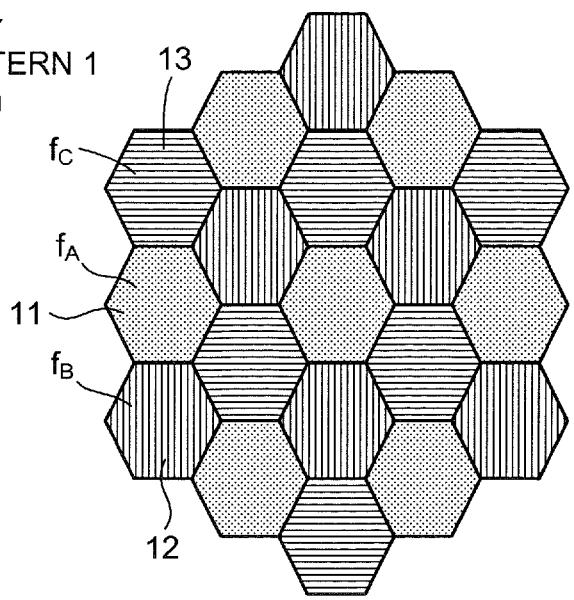
FREQUENCY ASSIGNMENT PATTERN 1
TIME ZONE $t_1$
REPEAT
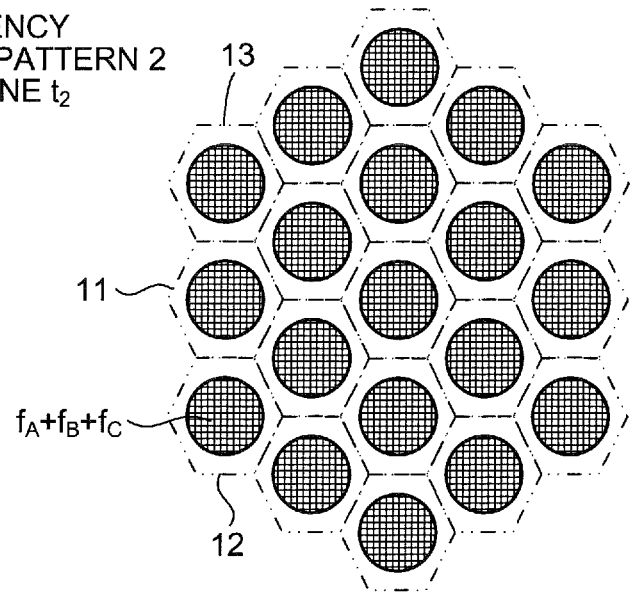
FREQUENCY ASSIGNMENT PATTERN 2
TIME ZONE $t_2$
$f_A + f_B + f_C$

WIRELESS COMMUNICATION SYSTEM, TERMINAL APPARATUS, AND COMMUNICATION METHOD

CROSS-REFERENCE TO RELATED APPLICATIONS

This is a continuation application of International Application Number PCT/JP2007/053814, which was filed on Feb. 28, 2007.

FIELD

The embodiments discussed herein are related to a wireless communication system, a terminal apparatus, and a communication method.

BACKGROUND

One form of a wireless communication system is a mobile communication system such as a mobile phone system. In the mobile communication system, transmission speed varies depending on the transmission speed per unit frequency and a frequency band. The transmission speed for each base station apparatus increases as the realizable transmission speed per unit frequency and the usable frequency band increase. The transmission speed for each terminal apparatus increases as the transmission speed per assigned unit frequency or unit time, the frequency band, and the time period increase.

FIG. 29 is a diagram of a configuration of the mobile communication system. As depicted in FIG. 29, the mobile communication system includes a terminal apparatus 1, a base station apparatus 2, network connecting equipment 3, and a communication network 4. The terminal apparatus 1 is connected to the base station apparatus 2 wirelessly. The base station 2 is connected to the network connecting equipment 3 by cable. The base station apparatus 2 converts and relays wireless and wired signals, manages wireless and wired lines, and controls communication with the terminal apparatus 1.

The base station apparatus 2 forms a cell or a cell-divided sector as an area in which to communicate with the terminal apparatus 1. The network connecting equipment 3 is connected to the communication network 4 by cable. The network connecting equipment 3 relays wired signals between multiple base station apparatuses 2 and between the base station apparatus 2 and the communication network 4, manages the wired lines thereof, and further manages the state of the terminal apparatus 1.

Schemes for communication between the terminal apparatus 1 and the base station apparatus 2 include Frequency Division Multiple Access (FDMA), Time Division Multiple Access (TDMA), Code Division Multiple Access (CDMA), Orthogonal Frequency Division Multiple Access (OFDMA), among others. The base station apparatus 2, according to the communication system to be employed, assigns to the terminal apparatus 1, a frequency, a time, a code, etc. for performing communication. The base station apparatus 2 assigns an appropriate modulation and coding scheme according to the wireless quality at the terminal apparatus 1.

Ordinarily, with FDMA, TDMA, OFDM, etc., to avoid interference in the vicinity of a border of adjacent cells or sectors (hereinafter, cell(s), etc.), usable frequency is divided into plural frequencies and a different frequency is assigned to each adjacent cell, etc. However, with such frequency division and assignment, the transmission speed between the terminal apparatus 1 and the base station apparatus 2 decreases because the frequency band of each cell, etc. narrows.

Therefore, a frequency assignment scheme has been proposed that is designed to improve the transmission speed by superimposing a divided frequency commonly over all cells, etc. (see, e.g., Japanese Laid-Open Patent Publication No. 2004-159345). FIG. 30 is a diagram for describing this frequency assignment scheme and FIG. 31 is a diagram depicting the relationship of the frequency, the time, and the transmission power of a signal transmitted from the base station apparatus in each cell, etc. depicted in FIG. 30. As depicted in these figures, the usable frequency is divided into four frequencies and cell A11 is assigned frequency $f_A$ different from the frequencies of adjacent cell B12 and cell C13. Frequency $f_D$ common among all cells is superimposed over this frequency $f_A$.

Likewise, the cell B12 and the cell C13 are assigned frequency $f_B$ and frequency $f_C$, respectively and the frequency $f_D$ is superimposed over each of these frequencies. According to this frequency assignment scheme, a terminal apparatus near the border of a cell, etc., cannot communicate with the base station apparatus using the frequency $f_D$ due to interference with adjacent cells, etc. that use the same frequency $f_D$. Therefore, in cell A11, for example, a terminal apparatus near the border of cell A11 communicates with the base station apparatus using the frequency $f_A$. On the other hand, a terminal apparatus near the center of the cell, etc., namely, in an area near the base station (indicated as a steel tower figure) can communicate with the base station apparatus by the frequency $f_D$ in addition to the frequency $f_A$.

According to the frequency assignment scheme disclosed in Patent Document 1, since each cell, etc., uses the frequency ($f_D$) common among all cells, etc., in addition to the frequency ($f_A$, $f_B$, or $f_C$) uniquely assigned to each cell, etc., the frequency band assigned to each cell, etc., becomes wider and the transmission speed is improved between the terminal apparatus and the base station apparatus. However, the frequency $f_D$ must be established separately.

SUMMARY

According to an aspect of an embodiment, a wireless communication system includes a first base station apparatus that includes a wireless unit, which performs transmission or reception using a first frequency at a first time slot and performs the transmission or the reception using both the first frequency and a second frequency at a second time slot; and a second base station apparatus that includes a wireless unit, which performs the transmission or the reception using the second frequency at the first time slot and performs the transmission or the reception using both the first frequency and the second frequency at the second time slot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram of a frequency assignment method of the first embodiment of the wireless communication system;

FIG. 7 is a diagram of the frequency assignment method of a second embodiment of the wireless communication system;

FIG. 9 is a diagram of the wireless quality collecting procedure of a third embodiment of the wireless communication system;

FIG. 10 is a diagram of the base station apparatus of a fourth embodiment of the wireless communication system;

FIG. 11 is a diagram of the wireless quality collecting procedure of the fourth embodiment of the wireless communication system;

FIG. 12 is a diagram of the terminal apparatus of a fifth embodiment of the wireless communication system;

FIG. 13 is a diagram of the wireless quality collecting procedure of the fifth embodiment of the wireless communication system;

FIG. 14 is a diagram of the wireless quality collecting procedure of a sixth embodiment of the wireless communication system;

FIG. 15 is a diagram of the base station apparatus of a seventh embodiment of the wireless communication system;

FIG. 16 is a diagram of an example of location of the terminal apparatus;

FIG. 17 is a diagram of an example of the wireless quality at the terminal apparatus collected by the base station apparatus;

FIG. 20 is a diagram of a frequency assigning procedure of the ninth embodiment of the wireless communication system;

FIG. 21 is a diagram of the terminal apparatus of a tenth embodiment of the wireless communication system;

FIG. 25 is a diagram for explaining a frequency assignment scheme in burst fields;

DESCRIPTION OF EMBODIMENTS

Preferred embodiments of the present invention will be explained with reference to the accompanying drawings.

In the following description, while an example will be described in which a base station apparatus forms a cell, the "cell" may read as a sector when the base station apparatus forms the sector. In the description of each embodiment, content identical to that described in a first embodiment will be omitted. The present invention is not limited to the embodiments herein.

Figure 1:
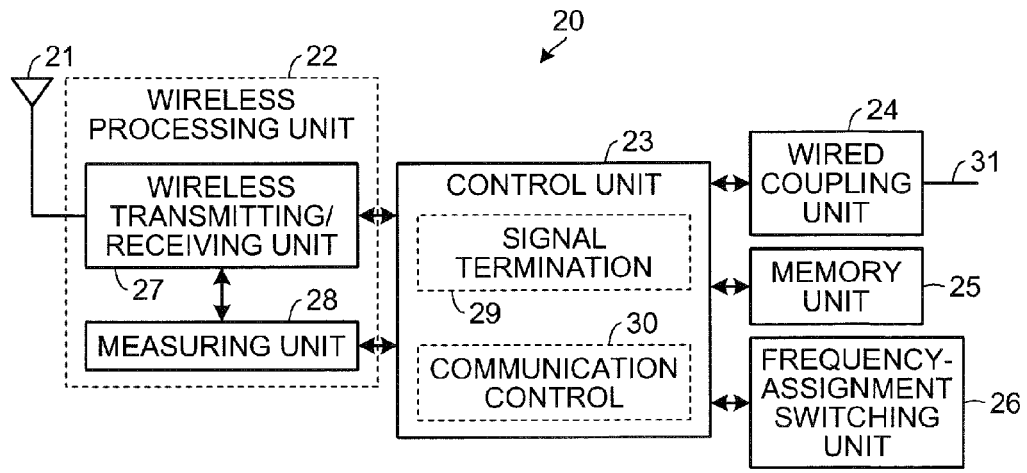
FIG. 1 is a diagram of a base station apparatus of a first embodiment of the wireless communication system according to the present invention.

FIG. 1 is a diagram of a base station apparatus of a first embodiment of the wireless communication system according to the present invention. As depicted in FIG. 1, a base station apparatus 20 includes an antenna 21, a wireless processing unit 22, a control unit 23, a wired coupling unit 24, a memory unit 25, and a frequency-assignment switching unit 26. The wireless processing unit 22 comprises a wireless transmitting/receiving unit 27 and a measuring unit 28.

The wireless transmitting/receiving unit 27 is connected to the terminal apparatus through wireless signals by way of the antenna 21. The wireless transmitting/receiving unit 27 receives information signals including audio, data, etc., and a control signal sent as a wireless signal from the terminal apparatus and converts the received signals into wired signals. The wireless transmitting/receiving unit 27 converts wired signals and a control signal sent from network connecting equipment into wireless signals and transmits the signals to the terminal apparatus. The measuring unit 28 measures the wireless quality. When the base station apparatus 20 forms the sector, the base station apparatus 20 has multiple wireless processing units 22.

The control unit 23 realizes a signal terminating function 29 of terminating the control signal from the terminal apparatus or the network connecting equipment and a communication control function 30 of performing the communication control and further generates and processes a control signal. The information signal and the control signal are transmitted and received between the terminal apparatus and the network connecting equipment by way of the wireless transmitting/receiving unit 27 and the wired coupling unit 24. The wired coupling unit 24 is connected to the network connecting equipment through wired signals by way of a wire 31 such as a signal cable. The memory unit 25 stores therein a variety of parameters, etc. The frequency-assignment switching unit 26 assigns a frequency assignment pattern and a time slot to each cell.

Figure 2:
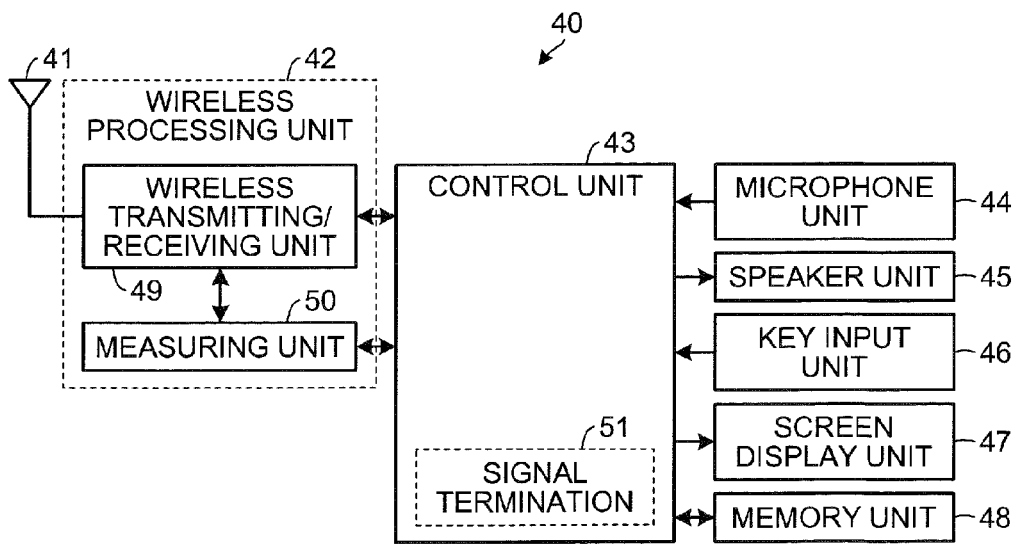
FIG. 2 is a diagram of a terminal apparatus of the first embodiment of the wireless communication system.

FIG. 2 is a diagram of a terminal apparatus of the first embodiment of the wireless communication system. As depicted in FIG. 2, a terminal apparatus 40 includes an antenna 41, a wireless processing unit 42, a control unit 43, a microphone unit 44, a speaker unit 45, a key input unit 46, a screen display unit 47, and a memory unit 48. The wireless processing unit 42 includes a wireless transmitting/receiving unit 49 and a measuring unit 50.

The wireless transmitting/receiving unit 49 is connected to the base station apparatus through wireless signals by way of the antenna 41. The wireless transmitting/receiving unit 49 receives information signals including audio, data, etc. sent from the communication network by way of the base station apparatus and a control signal sent from the base station apparatus or the network connecting equipment. The wireless transmitting/receiving unit 49 converts audio input from the microphone unit 44 and data stored in the memory unit 48 into wireless signals and transmits the signals to the base station apparatus. The measuring unit 50 measures the wireless quality.

The control unit 43 implements a signal terminating function 51 of terminating the control signal from the base station apparatus or the network connecting equipment and, generates and processes a control signal. The microphone unit 44 and the key input unit 46 are used respectively for inputting audio and data to be transmitted to the communication network by way of the base station apparatus. The speaker unit 45 and the screen display unit 47 are used respectively for outputting audio and data sent from the communication network by way of the base station apparatus. The memory unit 48 stores therein the received data, various parameters, etc.

The terminal apparatus 40 is, for example, a mobile phone. The terminal apparatus 40 may also be configured by a combination of a device such as a wireless connection card provided with the wireless processing unit 42, the control unit 43, and the memory unit 48 and a personal computer functioning as a substitute for the key input unit 46, the screen display unit 47, and the memory unit 48.

Figure 4:
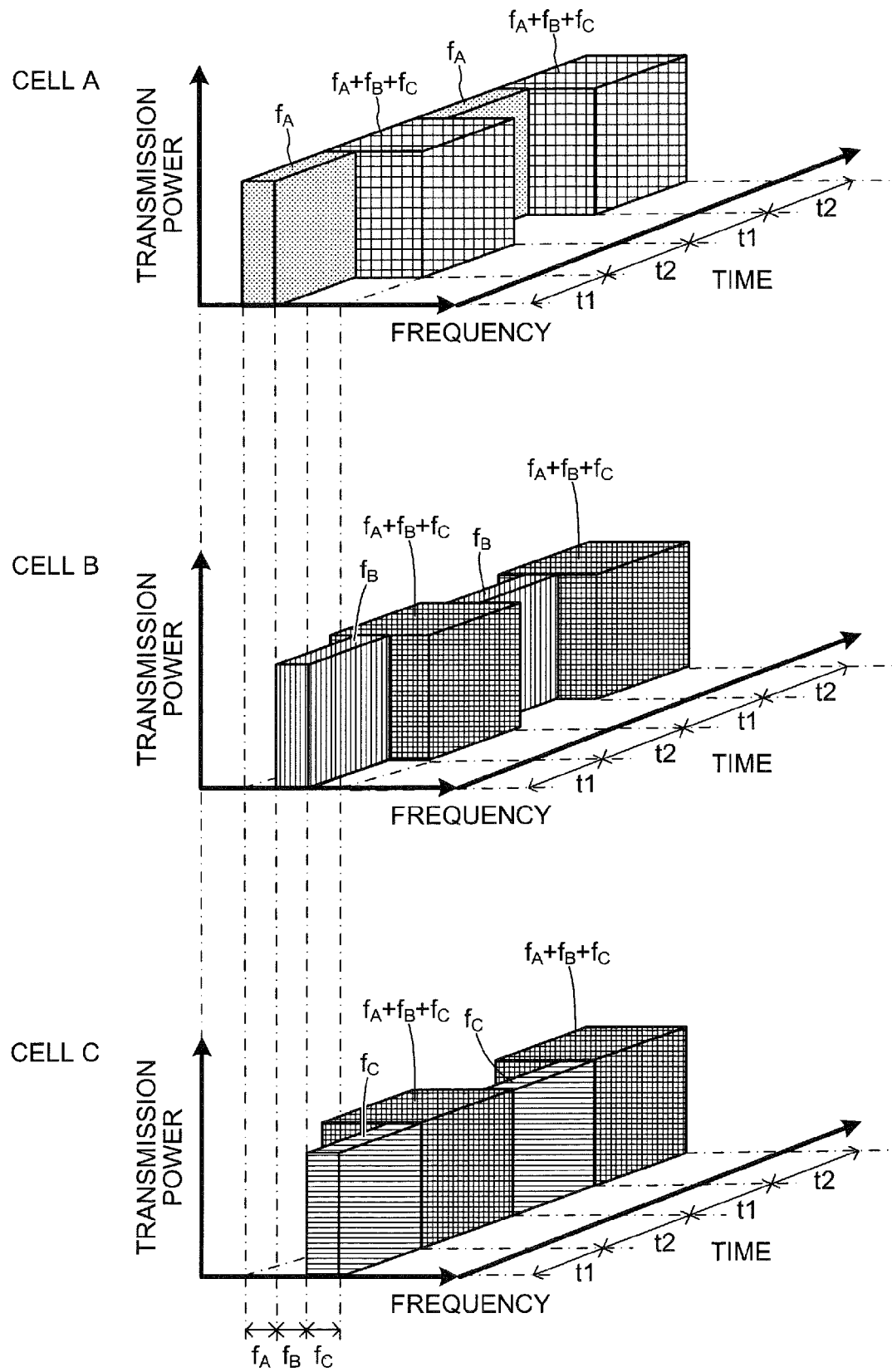
FIG. 4 is a diagram of a relationship of the frequency, the time, and the transmission power of a transmitted signal from the base station apparatus in each cell depicted in FIG. 3.

FIG. 3 is a diagram of a frequency assignment method of the first embodiment of the wireless communication system. FIG. 4 is a diagram of a relationship of the frequency, the time, and the transmission power of a transmitted signal from the base station apparatus in each cell depicted in FIG. 3. As depicted in these figures, usable frequency is divided into, for example, three frequencies. There are two types of frequency assignment patterns for cell A11, cell B12, and cell C13, i.e., frequency assignment pattern 1 and frequency assignment pattern 2.

That is to say, as depicted in FIG. 3, in a wireless communication system provided with a first and a second base station apparatus (base station apparatuses forming, e.g., cell A and cell B; hereinafter referred to as base station A and base station B), the base station A performs transmission using, among a first frequency (hereinafter, $F_A$) and a second frequency (hereinafter, $F_B$), the $F_A$ during a first time slot (t1) and performs transmission using both of the $F_A$ and the $F_B$ during a second time slot (t2). The base station B performs transmission using, among the $F_A$ and the $F_B$, the $F_B$ during the first time slot (t1) and performs transmission using both of the $F_A$ and the $F_B$ during the second time slot (t2). More specific description will be given.

In the frequency assignment pattern 1, cell A11, cell B12, and cell C13 are adjacent cells (hereinafter, adjacent cells) and are respectively assigned frequencies $f_A$, $f_B$, and $f_C$ that differ. Therefore, the frequency assignment pattern 1 enables the prevention of interference between the adjacent cells. In the frequency assignment pattern 2, cell A11, cell B12, and cell C13 are assigned the entire frequency, namely, [$f_A+f_B+f_C$]. Therefore, the frequency assignment pattern 2 enables improvement of the transmission speed in all of the cells A11, B12, and C13.

The time slot of the frequency assignment pattern 1 is $t_1$ and the time slot of the frequency assignment pattern 2 is $t_2$. The time slot $t_1$ and the time slot $t_2$ may be alternately repeated. Nevertheless, as depicted in FIG. 4, in both the frequency assignment pattern 1 and the frequency assignment pattern 2, the base station apparatus in each cell transmits radio waves with an ordinary transmission power sufficient to cover an entire area of the cell.

In the frequency assignment pattern 2, however, interference between adjacent cells makes communication difficult between the base station apparatus and a terminal apparatus near the border of a cell. Therefore, as depicted in FIG. 3, in the frequency assignment pattern 2, only base station surrounding areas 14, 15, and 16 are in a communicable state and cell border areas 17, 18, and 19 are in an incommunicable state. In light of this, the transmission power in the frequency assignment pattern 2 may be limited so that the radio waves will reach only the base station surrounding areas 14, 15, and 16 excluding such incommunicable cell border areas 17, 18, and 19. In this case, power saving may be achieved.

Figure 5:
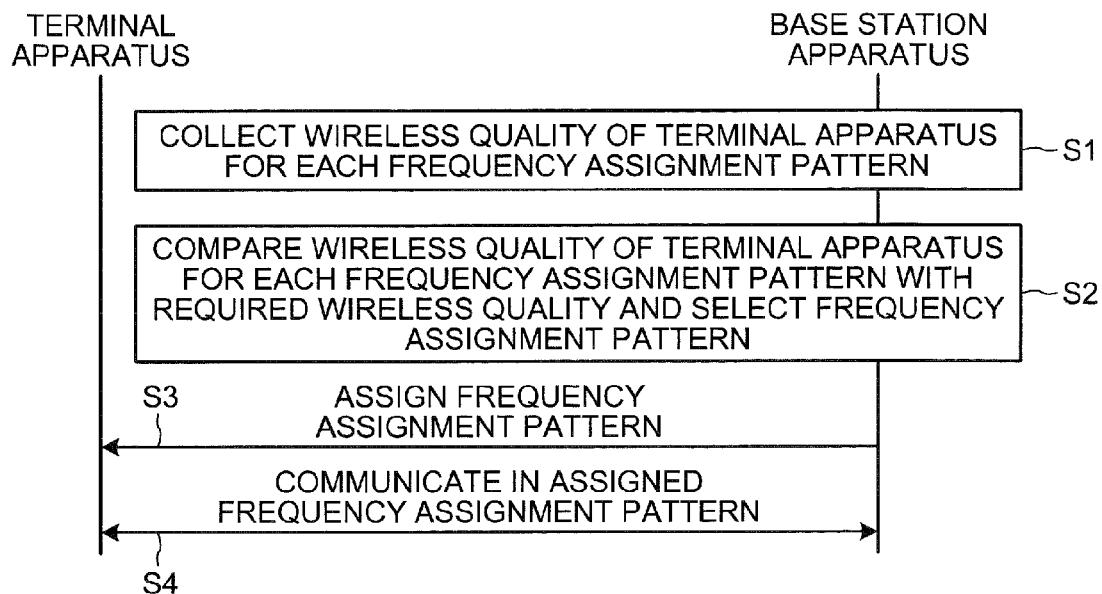
FIG. 5 is a diagram of a frequency assignment procedure of the first embodiment of the wireless communication system.

FIG. 5 is a diagram of a frequency assignment procedure of the first embodiment of the wireless communication system. In cell A11, cell B12, and cell C13, the base station apparatus alternately repeats the time slot $t_1$ of the frequency assignment pattern 1 and the time slot $t_2$ of the frequency assignment pattern 2. The frequency assignment patterns and the time slots are stored in advance in the memory unit 25 of the base station apparatus as parameters (setting values). Such prepared parameters may be treated as fixed values or configuration may be such that the prepared parameters are treated as initial values and the frequency assignment pattern and time slot parameters are changed as necessary and stored in the memory unit 25 of the base station apparatus.

Switching between the frequency assignment pattern 1 and the frequency assignment pattern 2 is performed by the frequency-assignment switching unit 26 of the base station apparatus according to parameters stored in the memory unit 25 of the base station apparatus. In either of the frequency assignment patterns, the transmission power of the base station apparatus is an ordinary transmission power, as described above. In this state, as depicted in FIG. 5, the base station apparatus collects the wireless quality at the terminal apparatus for the frequency assignment pattern 1 and the frequency assignment pattern 2 (step S1).

Due to interference between adjacent cells, the wireless quality improves as the terminal apparatus approaches the center of the cell and degrades as the terminal apparatus approaches the border of a cell. Even if the location of the terminal apparatus is same within the cell, the wireless quality improves as the cells using the same frequency are separated farther from each other. Here, the wireless quality may be indicated by signal-to-interference-noise ratio or received power. The timing of collection of the wireless quality may be periodic or may be event-triggered based on a request, etc. from the base station apparatus.

The base station apparatus compares the wireless quality at the terminal apparatus collected for each frequency assignment pattern with the wireless quality required to ensure the communication quality. The base station apparatus selects, for each terminal apparatus, a frequency assignment pattern satisfying the required wireless quality as the frequency assignment pattern for communication with the terminal apparatus (step S2). Here, the required wireless quality is common to the frequency assignment pattern 1 and the frequency assignment pattern 2 and is stored in advance in the memory unit 25 of the base station apparatus as parameters (setting values).

As the terminal apparatus approaches the center of a cell, the terminal apparatus may select the frequency assignment pattern with a closer distance to the cell using the same frequency around such a cell and with a wider frequency band per cell. That is to say, as the terminal apparatus comes closer to the center of the cell, it may select more frequency assignment patterns.

In the example depicted in FIG. 3, in each cell A11, B12, and C13, a terminal apparatus in the base station surrounding area 14, 15, or 16 may select both the frequency assignment pattern 1 and the frequency assignment pattern 2. On the other hand, a terminal apparatus in the cell border area 17, 18, or 19 may select only the frequency assignment pattern 1 without selecting the frequency assignment pattern 2. The base station apparatus, referring to such selection, assigns to each terminal apparatus, the frequency assignment pattern in which to communicate (step S3).

In such assignment, the base station apparatus may assign to the terminal apparatus that is capable of selecting both the frequency assignment pattern 1 and the frequency assignment pattern 2, either the frequency assignment pattern 1 or the frequency assignment pattern 2 or both. When both frequency assignment patterns are assigned, the time period for which the pattern is assigned becomes long and the transmission speed per terminal apparatus is improved. When the base station apparatus narrows down frequency assignment patterns to some patterns to be actually assigned, the base station apparatus preferentially selects patterns having wide frequency band, good wireless quality at the terminal apparatus, etc.

The base station apparatus may assign to the terminal apparatus, different frequency assignment patterns for an uplink and a downlink. The base station apparatus may assign to the terminal apparatus, the time period, etc., for communicating with the terminal apparatus in addition to the frequency assignment pattern. If the communication system employs an adaptive modulation scheme, the base station apparatus may assign a modulation and coding scheme to the terminal apparatus. Once the assignment of a frequency assignment pattern is finished, the base station apparatus and the terminal apparatus communicate according to the assigned frequency assignment pattern (step S4).

Figure 6:
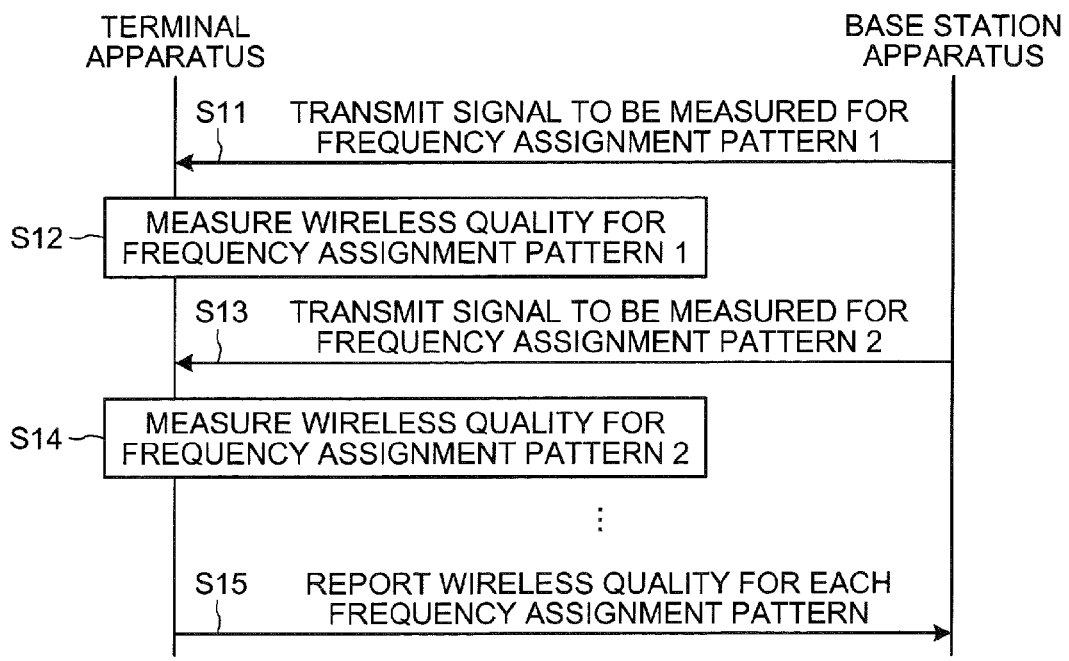
FIG. 6 is a diagram of a wireless quality collecting procedure of the first embodiment of the wireless communication system.

FIG. 6 is a diagram of a wireless quality collecting procedure of the first embodiment of the wireless communication system. As depicted in FIG. 6, at the time slot $t_1$ of the frequency assignment pattern 1 and at the frequency to be used for the frequency assignment pattern 1, the base station apparatus transmits, to the terminal apparatus and at a given transmitting power, a signal that is to be measured (step S11). This signal that is to be measured is a signal of a fixed format that differs from one cell to another. The base station apparatus also requests the terminal apparatus to measure and report the wireless quality of the fixed-format signal in the frequency assignment pattern 1.

At the time slot $t_1$ of the frequency assignment pattern 1, the terminal apparatus receives the fixed-format signal at the wireless transmitting/receiving unit 49 and measures the wireless quality at the measuring unit 50 (step S12). Then, in the same manner with respect to the frequency assignment pattern 2, the base station apparatus transmits a fixed-format signal to the terminal apparatus and requests the terminal apparatus to measure and report the wireless quality (step S13). In response, the terminal apparatus measures the wireless quality for the frequency assignment pattern 2 (step S14). In this example, there are two frequency assignment patterns, pattern 1 and 2 but when there are frequency assignment patterns of 3 or more, the same procedure is performed with respect to each of the patterns.

The terminal apparatus reports the wireless quality measured for each frequency assignment pattern to the base station apparatus (step S15). When the fixed format, varying from cell to cell, of the signal that is to be measured is already known to each terminal apparatus and the wireless quality for each cell may be distinguished by utilizing the fixed format, configuration may be such that at the time slot of the frequency assignment pattern in which all assigned frequencies are used simultaneously, the wireless quality for each cell will be measured and the wireless quality for each frequency assignment pattern will be calculated from the measured wireless quality.

A second embodiment differs from the first embodiment in the following respect. At the time slot $t_1$ of the frequency assignment pattern 1, with the ordinary transmitting power enabling the radio waves to reach the entire area formed by the base station apparatus, each cell is assigned a frequency that differs from those of adjacent cells. Over the frequency that differs from those of adjacent cells, the frequencies assigned to the adjacent cells are superimposed and restricted in such manner that the superimposed frequencies will not reach the cell border area. The time slot $t_2$ of the frequency assignment pattern 2 is the same as in the first embodiment.

Figure 8:
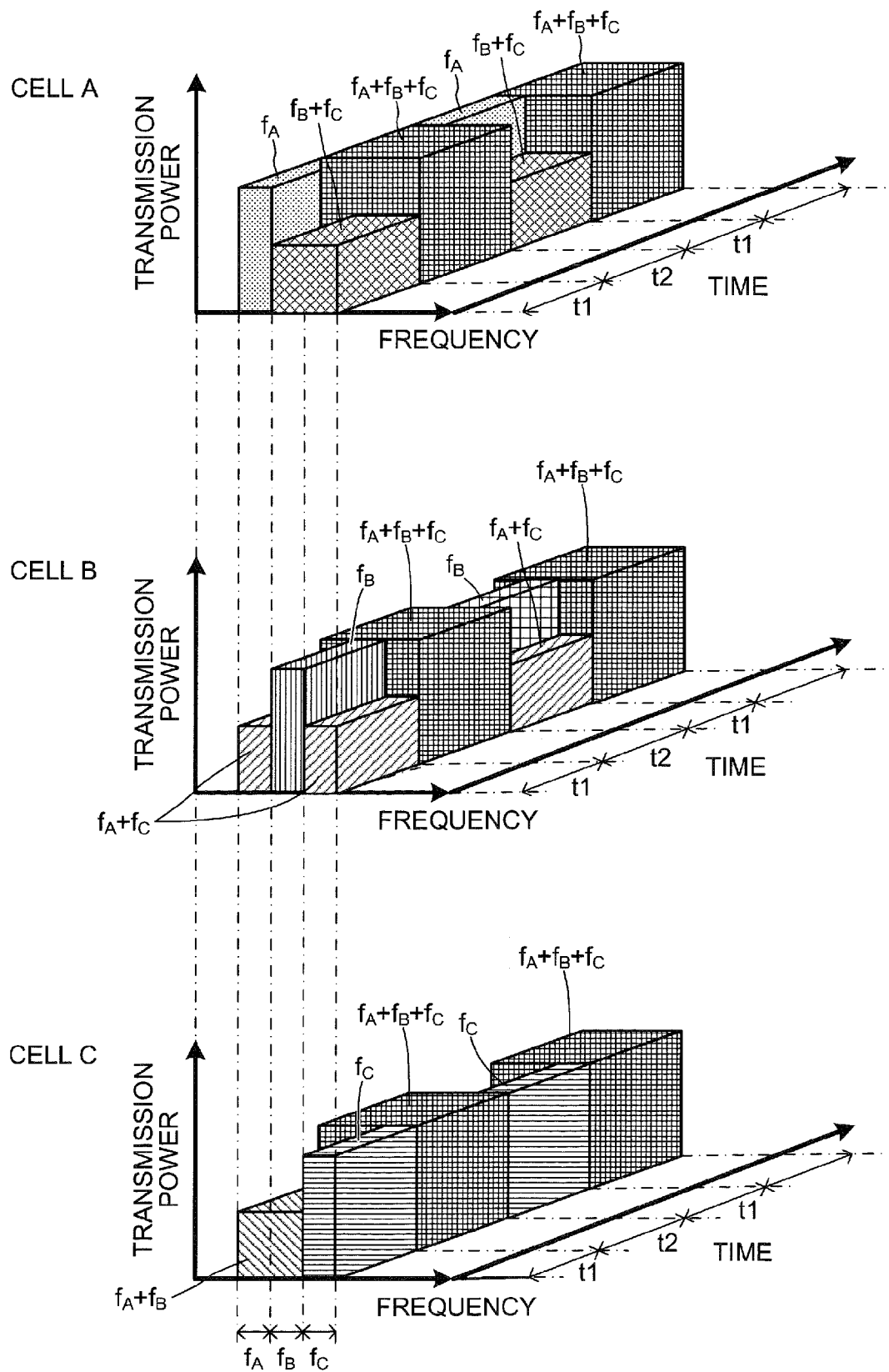
FIG. 8 is a diagram of a relationship of the frequency, the time, and the transmission power of the transmitted signal from the base station apparatus in each cell depicted FIG. 7.

FIG. 7 is a diagram of the frequency assignment method of the second embodiment of the wireless communication system. FIG. 8 is a diagram of a relationship of the frequency, the time, and the transmission power of the transmitted signal from the base station apparatus in each cell depicted FIG. 7. As depicted in these figures, at the time slot $t_1$ of the frequency assignment pattern 1, cell A11 is assigned the frequency $f_A$ with the ordinary transmission power and the frequencies $f_B$ and $f_C$ with the restricted transmission power.

Likewise, cell B12 is assigned the frequency $f_B$ with the ordinary transmission power and the frequencies $f_A$ and $f_C$ with the restricted transmission power. Cell C13 is assigned the frequency $f_C$ with the ordinary transmission power and the frequencies $f_A$ and $f_B$ with the restricted transmission power.

A third embodiment differs from the first embodiment in the following respect. The base station apparatus measures, in the uplink, the wireless quality of the signals received for each frequency assignment pattern from the terminal apparatus, thereby collecting the wireless quality for the terminal apparatus for each frequency assignment pattern. The base station apparatus periodically performs measurement of the wireless quality.

FIG. 9 is a diagram of the wireless quality collecting procedure of the third embodiment of the wireless communication system. As depicted in FIG. 9, at the time slot $t_1$ of the frequency assignment pattern 1 and at the frequency to be used for the frequency assignment pattern 1, the terminal apparatus transmits, at a given transmitting power and to the base station apparatus, a signal that is to be measured (step S21). The signal that is to be measured is a signal with a fixed format that differs from one terminal apparatus to another.

At the time slot $t_1$ of the frequency assignment pattern 1, the base station apparatus receives the fixed-format signal at the wireless transmitting/receiving unit 27 and measures the wireless quality at the measuring unit 28 (step S22). Then, in the same manner with respect to the frequency assignment pattern 2, the terminal apparatus transmits the fixed-format signal to the base station apparatus (step S23). In response, the base station apparatus measures the wireless quality for the frequency assignment pattern 2 (step S24).

In this example, there are two frequency assignment patterns, pattern 1 and pattern 2 but when there are frequency assignment patterns of 3 or more, the same procedure is performed with respect to each of the patterns. When the fixed format, different for each terminal apparatus of adjacent cells, of the signal that is to be measured is already known to each base station apparatus and the wireless quality for the terminal apparatus of each adjacent cell may be distinguished by utilizing the fixed format, configuration may be such that at the time slot of the frequency assignment pattern in which all assigned frequencies are used simultaneously, the wireless quality for terminal apparatuses in the adjacent cells will be measured and the wireless quality for each frequency assignment pattern will be calculated from the measured wireless quality.

A fourth embodiment differs from the first embodiment in the following respect. The terminal apparatus measures, in the downlink, the wireless quality of the signal received, in a frequency assignment pattern, from the base station apparatus and reports the wireless quality to the base station apparatus. By calculating the wireless quality of the terminal apparatus for each frequency assignment pattern from the reported wireless quality, the base station apparatus collects the wireless quality of the terminal apparatus for each frequency assignment pattern.

FIG. 10 is a diagram of the base station apparatus of the fourth embodiment of the wireless communication system. As depicted in FIG. 10, a base station apparatus 60 is provided with an estimating unit 61 in addition to the configuration of the base station apparatus 20 of the first embodiment. Based on the wireless quality for a frequency assignment pattern reported from the terminal apparatus, the estimating unit 61 calculates the wireless quality for other frequency assignment patterns. For example, the estimating unit 61 calculates the wireless quality for the frequency assignment pattern 2 (or frequency assignment pattern 1) based on the wireless quality for the frequency assignment pattern 1 (or frequency assignment pattern 2).

FIG. 11 is a diagram of the wireless quality collecting procedure of the fourth embodiment of the wireless communication system. As depicted in FIG. 11, at the time slot of a frequency assignment pattern (e.g., frequency assignment pattern 1), the base station apparatus transmits, to the terminal apparatus in the same manner as in the first embodiment, the signal that is to be measured (step S31). The base station apparatus also requests the terminal apparatus to measure and report the wireless quality for the frequency assignment pattern.

At the time slot of the frequency assignment pattern (e.g., frequency assignment pattern 1), the terminal apparatus receives the signal that is to be measured and measures the wireless quality (step S32). Then, the terminal apparatus reports the wireless quality for the frequency assignment pattern to the base station apparatus (step S33). Based on the reported wireless quality, the base station apparatus calculates, at the estimating unit 61, the wireless quality at the terminal apparatus for other frequency assignment patterns (e.g., frequency assignment pattern 2) (step S34). In such calculation, the estimating unit 61 calculates the wireless quality based on, for example, a difference of the wireless quality expected for each frequency assignment pattern. These differences are stored in advance in the memory unit 25 of the base station apparatus 60 as parameters (setting values).

A fifth embodiment differs from the first embodiment in the following respect. The terminal apparatus measures, in the downlink, the wireless quality of the signal received, in a frequency assignment pattern, from the base station apparatus. Based on the measured wireless quality, the terminal apparatus calculates the wireless quality for each frequency assignment pattern and reports the wireless quality obtained by the measurement and the calculation to the base station apparatus, whereby the base station apparatus collects the wireless quality at the terminal apparatus for each frequency assignment pattern.

FIG. 12 is a diagram of the terminal apparatus of the fifth embodiment of the wireless communication system. As depicted in FIG. 12, a terminal apparatus 70 is provided with an estimating unit 71 in addition to the configuration of the terminal apparatus 40 of the first embodiment. At the terminal apparatus, based on the wireless quality for a frequency assignment pattern received from the measuring unit 50, the estimating unit 71 calculates the wireless quality for other frequency assignment patterns. For example, the estimating unit 71 calculates the wireless quality for the frequency assignment pattern 2 (or frequency assignment pattern 1) based on the wireless quality for the frequency assignment pattern 1 (or frequency assignment pattern 2).

FIG. 13 is a diagram of the wireless quality collecting procedure of the fifth embodiment of the wireless communication system. As depicted in FIG. 13, at the time slot of a frequency assignment pattern (e.g., frequency assignment pattern 1), the base station apparatus transmits, to the terminal apparatus in the same manner as in the first embodiment, the signal that is to be measured (step S41). The base station apparatus also requests the terminal apparatus to report the measurement of the wireless quality for the frequency assignment pattern and the wireless quality for each frequency assignment pattern.

At the time slot of the frequency assignment pattern (e.g., frequency assignment pattern 1), the terminal apparatus receives the signal that is to be measured and measures the wireless quality (step S42). Based on the measured wireless quality, the terminal apparatus then calculates, at the estimating unit 71, the wireless quality for other frequency assignment patterns (e.g., frequency assignment pattern 2) (step S43). In such calculation, the estimating unit 71 calculates the wireless quality based on, for example, a difference of the wireless quality expected for each frequency assignment pattern. These differences are reported in advance by the base station apparatus and stored in advance in the memory unit 48 of the terminal apparatus 70 as parameters (setting values). The terminal apparatus reports the wireless quality obtained by the measurement and the calculation to the base station apparatus (step S44).

A sixth embodiment differs from the first embodiment in the following respect. The base station apparatus measures, in the uplink, the wireless quality of the signal received, in a frequency assignment pattern, from the terminal apparatus. By calculating the wireless quality at the terminal apparatus for each frequency assignment pattern from the wireless quality obtained by such measurement, the base station apparatus collects the wireless quality at the terminal apparatus for each frequency assignment pattern. The base station apparatus periodically performs the measurement of the wireless quality.

In the sixth embodiment, the base station apparatus is of the same configuration as the base station apparatus 60 depicted in FIG. 10. However, according to the sixth embodiment, the estimating unit 61 calculates the wireless quality for other frequency assignment patterns, based on the wireless quality for a frequency assignment pattern received from the measuring unit 28.

FIG. 14 is a diagram of the wireless quality collecting procedure of the sixth embodiment of the wireless communication system. As depicted in FIG. 14, at the time slot of a frequency assignment pattern (e.g., frequency assignment pattern 1), the terminal apparatus transmits, to the base station apparatus in the same manner as in the third embodiment, the signal that is to be measured (step S51).

At the time slot of the frequency assignment pattern (e.g., frequency assignment pattern 1), the base station apparatus receives the signal that is to be measured and at the measuring unit 28, measures the wireless quality (step S52). Based on the obtained wireless quality, the base station apparatus calculates, at the estimating unit 61, the wireless quality at the terminal apparatus for other frequency assignment patterns (e.g., frequency assignment pattern 2) (step S53). In such calculation, the estimating unit 61 calculates the wireless quality based on, for example, a difference of the wireless quality expected for each frequency assignment pattern. These differences are stored in advance in the memory unit 25 of the base station apparatus 60 as parameters (setting values).

Among the first to the sixth embodiments so far described, for example, the first embodiment, the fourth embodiment, and the fifth embodiment are suitable for selection of the frequency assignment pattern in the downlink. The third embodiment and the sixth embodiment are suitable for selection of the frequency assignment pattern in the uplink. The first embodiment and the third embodiment, which measure the wireless quality of the signal received for each frequency assignment pattern, have the effect of being excellent in accuracy. On the other hand, the fourth embodiment, the fifth embodiment, and the sixth embodiment, which calculate the wireless quality for each frequency assignment pattern based on the wireless quality of the signal received in a frequency assignment pattern, are effective in increasing the speed of the procedure and efficient utilization of the frequency.

A seventh embodiment is an example of narrowing down frequency assignment patterns selected for a terminal apparatus in the communication system in which the transmission speed for each terminal apparatus with respect to each frequency assignment pattern is not determined solely by the wireless quality at the terminal apparatus. In this example, the base station apparatus assigns the frequency assignment pattern for communication with the terminal apparatus based on the wireless quality at the terminal apparatus for each frequency assignment pattern and the transmission speed expected for each frequency assignment pattern.

FIG. 15 is a diagram of the base station apparatus of the seventh embodiment of the wireless communication system. As depicted in FIG. 15, the base station apparatus 80 is provided with a speed calculating unit 81 in addition to the configuration of the base station apparatus 20 of the first embodiment. The speed calculating unit 81 calculates an expected transmission speed per terminal apparatus. In the communication system employing the adaptive modulation scheme, for example, if the transmission speed per unit time and unit frequency in the modulation and coding scheme assigned to the terminal apparatus is given as E, the frequency band is given as F, and the time period is given as G, the speed calculating unit 81 calculates the expected transmission speed per terminal apparatus as [E×F×G].

The modulation and coding scheme is determined based on the wireless quality at the terminal apparatus. If it is assumed that the frequency band and the time period assigned to the terminal apparatus are proportional to the frequency band and the time period forming each frequency assignment pattern, the latter frequency band and time period may be used in place of the former frequency band and time period. The transmission speed per unit frequency in the modulation and coding scheme is stored in advance in the memory unit 25 of the base station apparatus 80 as a parameter (setting value). The base station apparatus 80 compares the expected transmission speed per terminal apparatus for each frequency assignment pattern and preferentially selects the frequency assignment patterns having excellent transmission speed.

Description will be made with a specific example. In the example, the time slot $t_1$ of the frequency assignment pattern 1 and the time slot $t_2$ of the frequency assignment pattern 2 are alternately repeated, as described in the first embodiment.

FIG. 16 is a diagram of an example of location of the terminal apparatus. As depicted in FIG. 16, with respect to a circle-marked terminal apparatus 91 located in the base station surrounding area 14 of cell A11, the wireless quality is collected for each frequency assignment pattern. With respect to a square-marked terminal apparatus 92 located in the cell border area 17 of cell A11, the wireless quality is collected similarly. In the same manner as in the first embodiment, the base station surrounding area 14 is an area where communication may be implemented by both the frequency assignment pattern 1 and the frequency assignment pattern 2. The cell border area 17 is an area where the communication may be realized only by the frequency assignment pattern 1.

FIG. 17 is a diagram of an example of the wireless quality at the terminal apparatus collected by the base station apparatus. As depicted in FIG. 17, when comparing the wireless quality of both terminal apparatuses 91 and 92 for the same frequency assignment pattern, the wireless quality is better for the circle-marked terminal apparatus 91. When comparing the wireless quality of either terminal apparatus 91, 92 for each frequency assignment pattern, the wireless quality is better for the frequency assignment pattern 1. When the wireless quality required to ensure the communication quality is 3 dB, the frequency assignment pattern 1 and the frequency assignment pattern 2 may be selected for the circle-marked terminal apparatus 91. On the other hand, only the frequency assignment pattern 1 may be selected for the square-marked terminal apparatus 92.

In the communication system employing the adaptive modulation scheme, an example will be described where among the frequency assignment pattern 1 and the frequency assignment pattern 2, the patterns are narrowed down to one for the circle-marked terminal apparatus 91. As an example, it is assumed that, based on the wireless quality at the circle-marked terminal apparatus 91, for the frequency assignment pattern 1, the modulation and coding scheme by which the transmission speed per unit frequency becomes 2 bps/Hz is selected, that the assigned frequency band is 1 MHz, and that the assigned time period is 1 ms every 10 ms. In this example, the expected transmission speed per terminal apparatus for the frequency assignment pattern 1 is 200 kbps.

On the other hand, for the frequency assignment pattern 2, it is assumed that the modulation and coding scheme by which the transmission speed per unit frequency becomes 1 bps/Hz, that the assigned frequency band is 3 MHz is selected, and that the assigned time period is 1 ms every 10 ms. In this example, the expected transmission speed per terminal apparatus for the frequency assignment pattern 2 is 300 kbps. Therefore, to comply with the transmission speed, the frequency assignment pattern 2 is selected with respect to the circle-marked terminal apparatus 91.

An eighth embodiment is an example of narrowing down frequency assignment patterns selected for one terminal apparatus in the communication system in which each frequency assignment pattern is shared by plural terminal apparatuses. In this case, the base station apparatus assigns the frequency assignment pattern for communication with the terminal apparatus based on the wireless quality at the terminal apparatus for each frequency assignment pattern and the number of the terminal apparatuses sharing each frequency assignment pattern.

Figure 18:
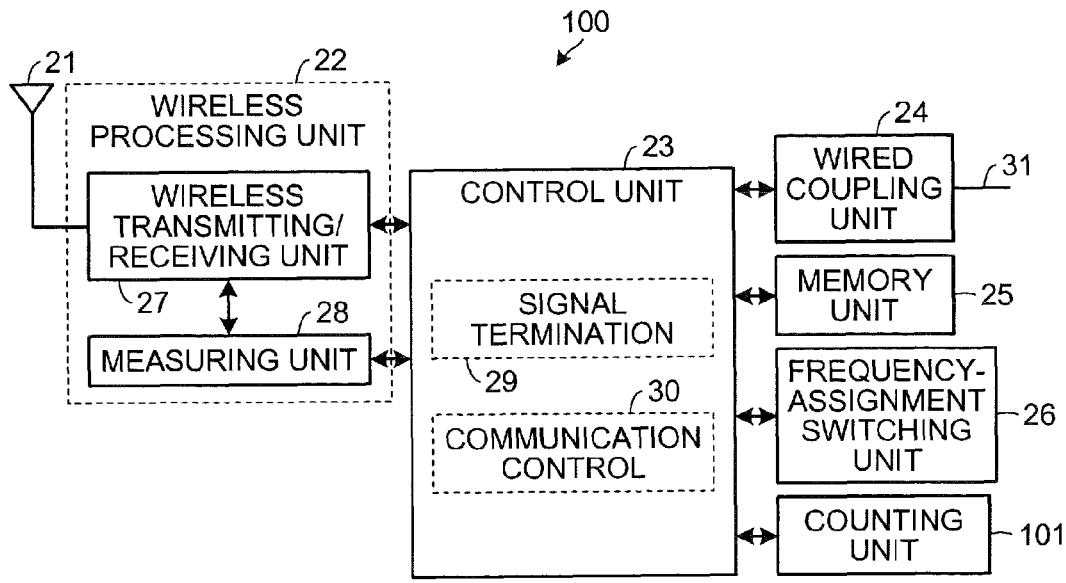
FIG. 18 is a diagram of the base station apparatus of an eighth embodiment of the wireless communication system.

FIG. 18 is a diagram of the base station apparatus of the eighth embodiment of the wireless communication system. As depicted in FIG. 18, base station apparatus 100 is provided with a counting unit 101 in addition to the configuration of the base station apparatus 20 of the first embodiment. The counting unit 101 counts the quantity of terminal apparatuses that may possibly select each frequency assignment pattern. The base station apparatus 100 compares the quantity of terminal apparatuses counted by the counting unit 101 and a reference terminal-apparatus-quantity. The reference terminal-apparatus-quantity differs for each frequency assignment pattern and is stored in advance in the memory unit 25 of the base station apparatus 100 as a parameter (setting value).

The base station apparatus 100 preferentially selects frequency assignment patterns for which the counted quantity of terminal apparatuses is less than the reference terminal-apparatus-quantity. Configuration may be such that the expected transmission speed per terminal apparatus is calculated from the counted quantity of terminal apparatuses and plural frequency assignment patterns selected are narrowed down based on the calculated transmission speed. For example, the maximum transmission speed that may be realized in one frequency assignment pattern is given as H and the counted quantity of terminal apparatuses is given as N.

In this example, the expected transmission speed per terminal apparatus is calculated as [H/N]. The base station apparatus 100 compares the expected transmission speed per terminal apparatus for each frequency assignment pattern and preferentially selects frequency assignment patterns for which the transmission speed is excellent. The maximum transmission speed that may be realized for each frequency assignment pattern is preferably stored in advance in the memory unit 25 of the base station apparatus 100 as a parameter (setting value).

A ninth embodiment differs from the first embodiment in the following respect. The terminal apparatus collects the wireless quality at the terminal apparatus for each frequency assignment pattern by measuring, in the downlink, the wireless quality of the signal received for each frequency assignment pattern from the base station apparatus. The terminal apparatus, comparing the collected wireless quality for each frequency assignment pattern with the wireless quality required to ensure the transmission quality, selects the frequency assignment pattern for communication with the base station apparatus and requests the selected frequency assignment pattern of the base station apparatus. The base station apparatus determines whether to enable the use of the frequency assignment pattern requested by the terminal apparatus.

Figure 19:
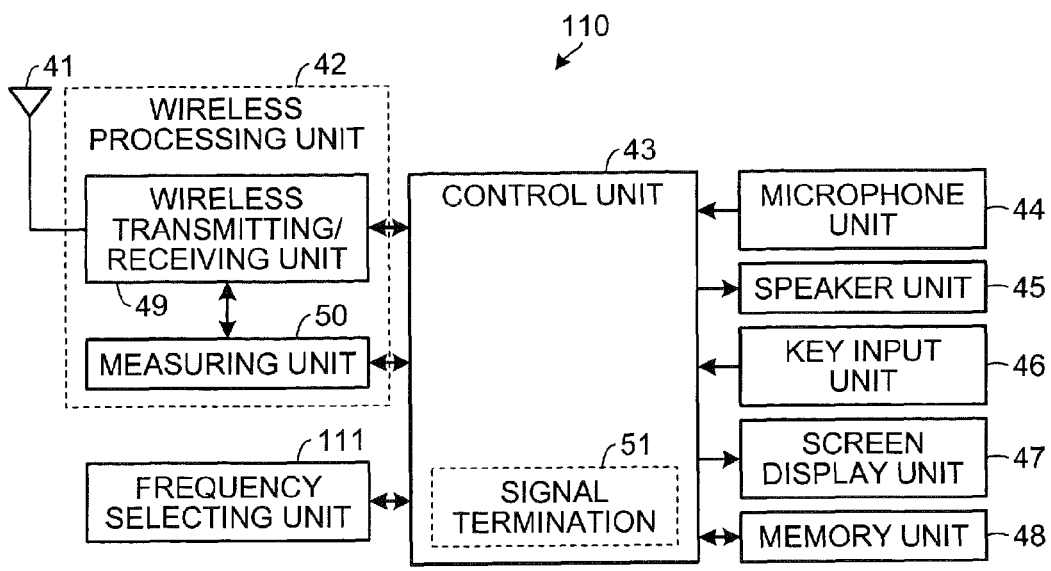
FIG. 19 is a diagram of the terminal apparatus of a ninth embodiment of the wireless communication system.

FIG. 19 is a diagram of the terminal apparatus of the ninth embodiment of the wireless communication system. As depicted in FIG. 19, a terminal apparatus 110 is provided with a frequency selecting unit 111 in addition to the configuration of the terminal apparatus 40 of the first embodiment. The frequency selecting unit 111 selects the frequency assignment pattern for communication with the base station apparatus, based on the wireless quality for each frequency assignment pattern.

FIG. 20 is a diagram of a frequency assigning procedure of the ninth embodiment of the wireless communication system. As depicted in FIG. 20, the terminal apparatus 110 collects the wireless quality for each frequency assignment pattern, periodically or based on a request, etc. from the base station apparatus (step S61). In such collection, the terminal apparatus 110 may collect the wireless quality for each frequency assignment pattern through the processing of step S11 to step S14 depicted in FIG. 6.

The terminal apparatus, at the frequency selecting unit 111, compares the collected wireless quality for each frequency assignment pattern with the wireless quality required to ensure the communication quality and selects the frequency assignment pattern satisfying the required wireless quality as the frequency assignment pattern for communication with the base station apparatus (step S62). The required wireless quality is common among the frequency assignment patterns and is reported in advance by the base station apparatus and stored in the memory unit 48 of the terminal apparatus 110.

The number of the frequency assignment patterns to be selected may be one or more. When narrowing down plural frequency assignment patterns selected, the frequency selecting unit 111 preferentially selects the frequency assignment pattern for which the wireless quality is excellent. The terminal apparatus then requests the base station apparatus to enable the selected frequency assignment pattern to be the frequency assignment pattern for communication with the base station apparatus (step S63).

The base station apparatus determines whether to enable the use of the requested frequency assignment pattern (step S64). The base station apparatus, referring to such determination, assigns the frequency assignment pattern to the terminal apparatus 110 (step S65). Once the assignment of the frequency assignment pattern is finished, the base station apparatus and the terminal apparatus 110 communicate with each other in the assigned frequency assignment pattern (step S66).

A tenth embodiment differs from the first embodiment in the following respect. The terminal apparatus measures, in the downlink, the wireless quality of the signal received for one frequency assignment pattern from the base station apparatus and based on the measured wireless quality, calculates the wireless quality for each frequency assignment pattern. The terminal apparatus, comparing the wireless quality for each frequency assignment pattern obtained by the measurement and the calculation and the wireless quality required to ensure the transmission quality, selects the frequency assignment pattern for communication with the base station apparatus and requests the selected frequency assignment pattern of the base station apparatus. The base station apparatus determines whether to enable the use of the frequency assignment pattern requested by the terminal apparatus.

FIG. 21 is a diagram of the terminal apparatus of the tenth embodiment of the wireless communication system. As depicted in FIG. 21, a terminal apparatus 120 is provided with the estimating unit 71 and the frequency selecting unit 111 in addition to the configuration of the terminal apparatus 40 of the first embodiment. The estimating unit 71 is as described in the fifth embodiment. The frequency selecting unit 111 is as described in the ninth embodiment. The frequency assignment procedure of the tenth embodiment is as depicted in FIG. 20. At step S61, however, the terminal apparatus 120 may collect the wireless quality for each frequency assignment pattern through the processing of step S41 to step S43 depicted in FIG. 13.

An eleventh embodiment is an example of totaling, for all terminal apparatuses in the cell, the selected number of times each frequency assignment pattern and changing the ratio of the time slots of the frequency assignment patterns according to the ratio of the totaled numbers of times, in the first to the tenth embodiments described above. Therefore, the base station apparatus of the eleventh embodiment is provided with the counting unit in addition to the configuration of the base station apparatus 20 of the first embodiment. The counting unit totals the selected number of times, etc., for each frequency assignment pattern.

In an application of the eleventh embodiment to the fourth embodiment, the base station apparatus is further provided with the estimating unit 61 (see FIG. 10). In an application of the eleventh embodiment to the seventh embodiment, the base station apparatus is further provided with the speed calculating unit 81 (see FIG. 15). In an application of the eleventh embodiment to the eighth embodiment, the base station apparatus is further provided with the counting unit 101 (see FIG. 18). The counting unit to be added in the eleventh embodiment may serve commonly as the counting unit 101 depicted in FIG. 18.

A procedure of dynamically changing the time slot of each frequency assignment pattern is as follows. Firstly, the base station apparatus totals, at the counting unit, the selected number of times for each frequency assignment pattern with respect to all terminal apparatuses in the cell. The selection of the frequency assignment pattern for a terminal apparatus is performed based on the wireless quality at the terminal apparatus for each frequency assignment pattern, the expected transmission speed per terminal apparatus for each frequency assignment pattern, the number of the terminal apparatuses that share each frequency assignment pattern, etc.

The base station apparatus changes the time slot of each frequency assignment pattern based on the ratio of the totaled numbers of times. This change is made when a predetermined total number is exceeded or a predetermined period for totaling has elapsed. Such predetermined total number and predetermined time are stored in advance in the memory unit of the base station apparatus as parameters (setting values). The frequency-assignment-switching-unit of the base station apparatus performs determination and change of the time slot of a frequency assignment pattern. The determination and the change of the time slot of a frequency assignment pattern may also be made through adjustment with the base station apparatus of the adjacent cell.

Figure 22:
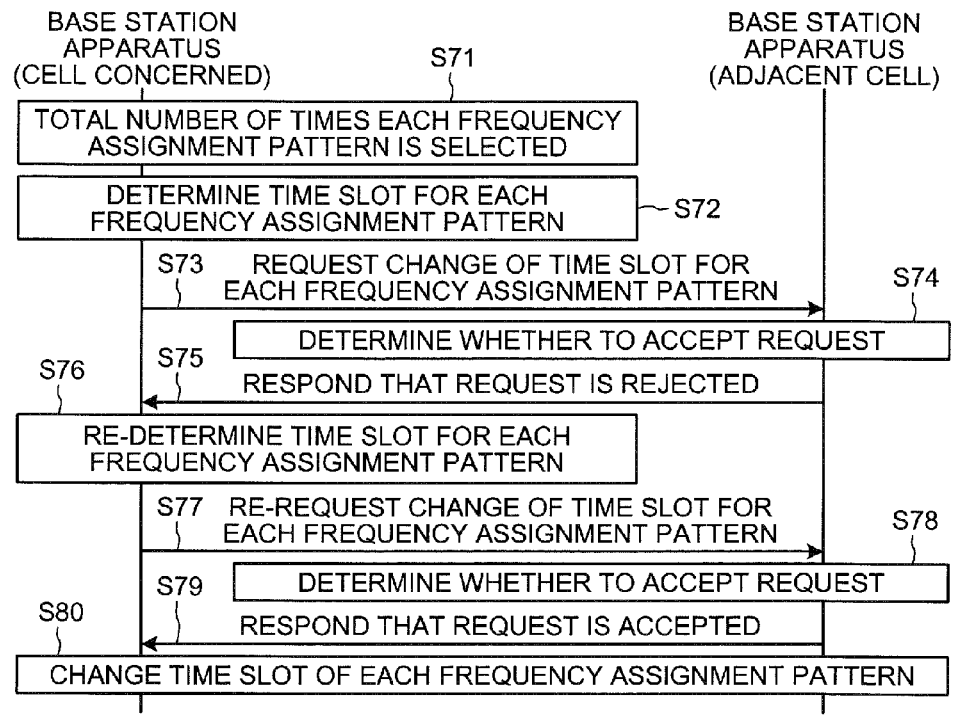
FIG. 22 is a diagram of an adjustment procedure at the time of determination and change of the time slot of each frequency assignment pattern.

FIG. 22 is a diagram of an adjustment procedure at the time of determination and change of the time slot of each frequency assignment pattern. In the description of this adjustment procedure, the cell formed by a base station apparatus that requests the base station apparatus of an adjacent cell to change the time slot of each frequency assignment pattern is referred to as a cell concerned.

As depicted in FIG. 22, the base station apparatus of the cell concerned totals, at the counting unit, the selected number of times for each frequency assignment pattern with respect to all terminal apparatuses in the cell concerned (step S71). The base station apparatus of the cell concerned then determines, at the frequency-assignment-switching unit, the time slot of each frequency assignment pattern based on the ratio of the numbers of times obtained by the totaling (step S72).

The base station apparatus of the cell concerned requests the base station apparatus of the adjacent cell to change the time slot of each frequency assignment pattern (step S73). In such requesting, the base station apparatus of the cell concerned notifies the base station apparatus of the adjacent cell of the determined time slot of each frequency assignment pattern, timing of the change thereof, etc. The information indicating whether the base station apparatus of the adjacent cell exists is stored in the memory unit of the base station apparatus of the cell concerned. Base station apparatuses of plural adjacent cells may be present.

The base station apparatus of the adjacent cell, upon receipt of the request from the base station apparatus of the cell concerned, determines whether to accept the request (step S74). In such determination, the base station apparatus of the adjacent cell compares the requested time slot of each frequency assignment pattern and the time slot of each frequency assignment pattern to be determined by itself (base station apparatus of the adjacent cell) in the same manner as done by the base station apparatus of the cell concerned and accepts the request if a difference between the two time slots is less than a reference difference. Conversely, the base station apparatus of the adjacent cell rejects the request if the difference between these two time slots is greater than the reference difference. The reference difference is stored in advance in the memory unit of the base station apparatus as a parameter (setting value).

In rejecting the request, the base station apparatus of the adjacent cell responds, to the base station apparatus of the cell concerned, that the request is rejected (step S75). In such response, the base station apparatus of the adjacent cell notifies a desired time slot for each frequency assignment pattern, etc. The base station apparatus of the cell concerned, referring to the desired time slot for each frequency assignment pattern, re-determines the time slot of each frequency assignment pattern (step S76). The base station apparatus of the cell concerned again requests the base station apparatus of the adjacent cell to change the time slot of each frequency assignment pattern (step S77).

The base station apparatus of the adjacent cell determines whether to accept the request (step S78) and if accepted, notifies, as a response to the base station apparatus of the cell concerned, that the request is accepted (step S79), whereby the base station apparatus of the cell concerned and the base station apparatus of the adjacent cell change the time slot of each frequency assignment pattern according to the time of execution of the change notified in the re-request from the base station apparatus of the cell concerned (step S80).

Figure 23:
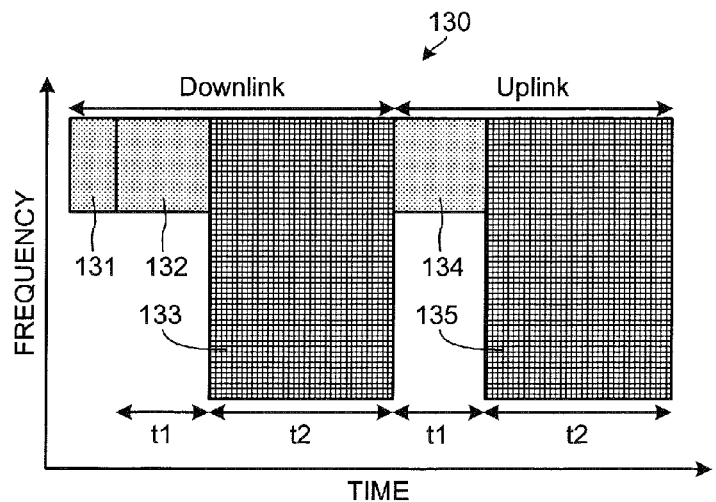
FIG. 23 is a diagram of a presumed frame configuration.

A twelfth embodiment is an example of application of the communication system to the Worldwide Interoperability for Microwave Access (WiMAX) scheme employing the OFDMA scheme. FIG. 23 is a diagram of a presumed frame configuration. As depicted in FIG. 23, in the WiMAX system, a frame 130 is configured as a basic transmission and reception unit. Each frame 130 has at its beginning a preamble 131 used for synchronizing the base station apparatus and the terminal apparatus and then has burst fields 132, 133, 134, and 135.

Each time slot of the burst fields 132, 133, 134, and 135 in the frame is called a zone. The burst fields 132, 133, 134, and 135 are divided into sub-frames of the uplink and the downlink. In the burst fields 132, 133, 134, and 135, data transmission and reception is performed between the base station apparatus and the terminal apparatus. In the WiMAX system, the frame is divided into plural sub-carriers in the frequency axis.

Figure 24:
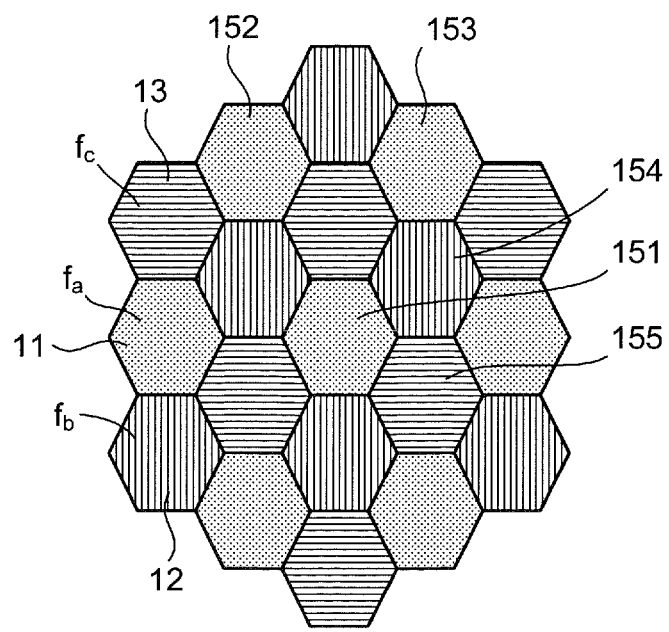
FIG. 24 is a diagram for explaining a frequency assignment scheme in the preamble.

FIG. 24 is a diagram for explaining a frequency assignment scheme in the preamble. As depicted in FIG. 24, in the preamble 131 of each frame 130, sub-carriers located at every third sub-carrier are used. That is to say, the sub-carrier of the preamble 131 may be present at three different locations. Adjacent cells use the preamble in the sub-carriers at different locations. For example, cell A11, cell B12, and cell C13 use the sub-carriers of frequencies $f_A$, $f_B$, and $f_C$ respectively.

FIG. 25 is a diagram for explaining a frequency assignment scheme in the burst fields. As depicted in FIG. 25, the burst fields are assigned the time slot $t_1$ at which the frequency assigned to the WiMAX system is divided into three frequencies and the adjacent cells use different frequencies $f_A$, $f_B$, and $f_C$ and the time slot $t_2$ at which all cells use the entire frequency assigned to the WiMAX system.

That is to say, at the time slot $t_1$, cell A11, cell B12, and cell C13 use the sub-carriers of the frequencies $f_A$, $f_B$, and $f_C$, respectively. At the time slot $t_2$, cell A11, cell B12, and cell C13 each use the sub-carrier of the frequency $f_A$, the sub-carrier of the frequency $f_B$, and the sub-carrier of the frequency $f_C$.

Both frequency assignment patterns may be assigned or one of the frequency assignment patterns may be assigned to each of the sub-frames of the uplink and the downlink. Alternatively, both of the frequency assignment patterns may be repeated between the frames. The base station apparatus of each cell transmits radio waves with an ordinary transmission power enabling the radio waves to reach the border with an adjacent cell, irrespective of the frequency assignment pattern.

Figure 26:
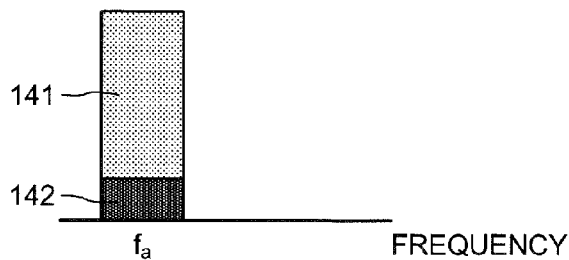
FIG. 26 is a diagram of the wireless quality of the sub-carrier of the preamble to interference noise in the sub-carrier of the same location.

FIG. 26 is a diagram of the wireless quality when the terminal apparatus measures the wireless quality of the sub-carrier of the preamble to interference noise in the sub-carrier of the same location. In FIG. 26, reference numeral 141 represents the wireless quality of the sub-carrier (frequency $f_a$) of the preamble in the cell in which the terminal apparatus itself is located (e.g., cell A151 depicted in FIG. 24).

Reference numeral 142 represents the wireless quality of the sub-carrier (frequency $f_a$) of the preamble in the cell (e.g., cell A11, cell A152, and cell A153 depicted in FIG. 24) using the same sub-carrier (frequency $f_a$) around the cell in which the terminal apparatus itself is located (e.g., cell A151 depicted in FIG. 24). As depicted in FIG. 26, since the preamble of the adjacent cell is not included, the wireless quality obtained in this case corresponds to the wireless quality when the adjacent cell uses a different frequency.

Figure 27:
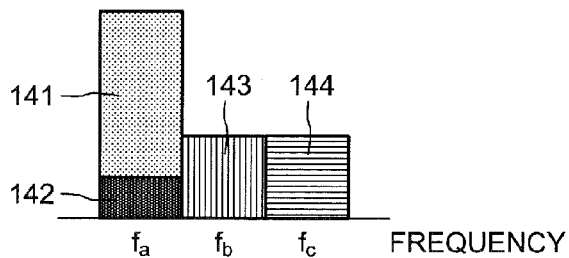
FIG. 27 is a diagram of the wireless quality of the sub-carrier of the preamble to interference noise in all the sub-carriers.

FIG. 27 is a diagram of the wireless quality when the terminal apparatus measures the wireless quality of the sub-carrier of the preamble to interference noise in all the sub-carriers. In FIG. 27, explanation concerning reference numeral 141 and 142 is identical to that above. Reference number 143 represents the wireless quality of a sub-carrier of the preamble in a cell (e.g., cell B12 and B154) that is near the cell in which the terminal apparatus itself is located (e.g., cell A151) and that uses a different sub-carrier (frequency fb).

Reference numeral 144 represents the wireless quality of a sub-carrier of the preamble in a cell (e.g., cell C13, and C155) that is near the cell in which the terminal apparatus itself is located (e.g., cell A151) and that uses a different sub-carrier (frequency $f_C$). As depicted in FIG. 27, since the preamble of the adjacent cell is included, the wireless quality obtained in this case corresponds to the wireless quality when the adjacent cell uses the same frequency.

Therefore, the terminal apparatus may measure, using the preamble, the wireless quality corresponding to the frequency assignment pattern 1 of the time slot $t_1$ in which the frequency assigned to the WiMAX system in the burst fields is divided into three frequencies and the adjacent cells use difference frequencies. The terminal apparatus may also measure, using the preamble, the wireless quality corresponding to the frequency assignment pattern 2 of the time slot $t_2$ in which the entire frequency assigned to the WiMAX system is used.

Figure 28:
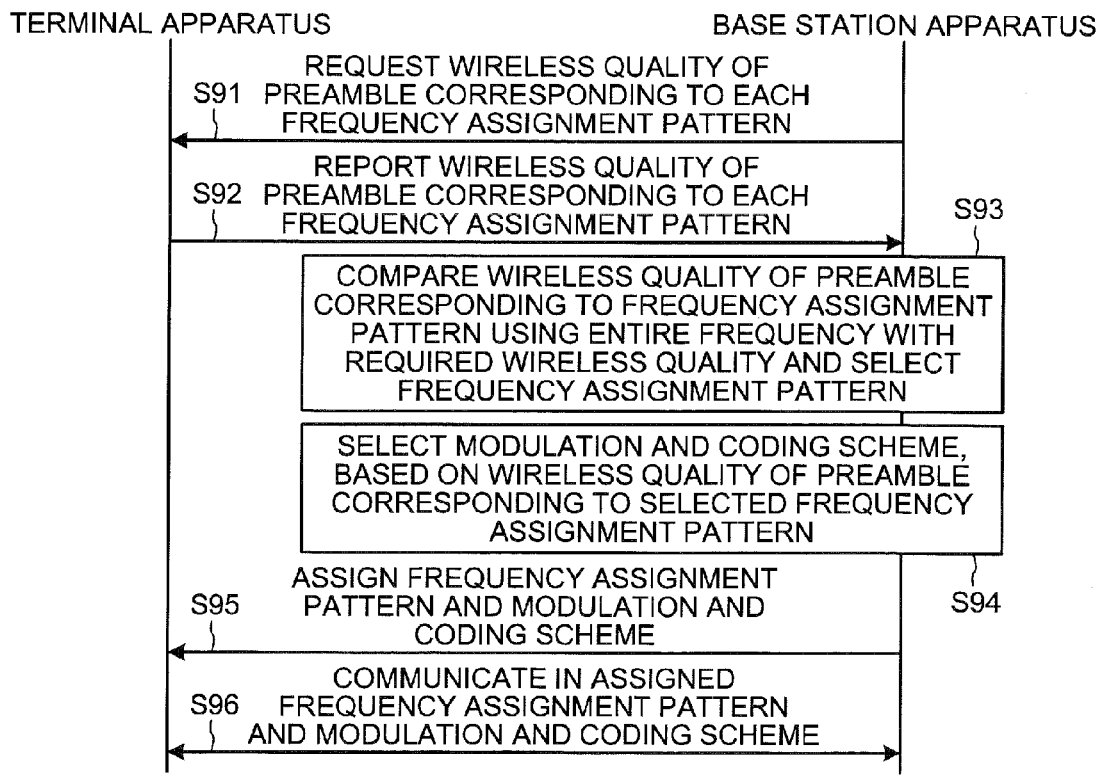
FIG. 28 is a diagram of a frequency and modulation and coding scheme assignment procedure of the twelfth embodiment of the wireless communication system.
Figure 29:
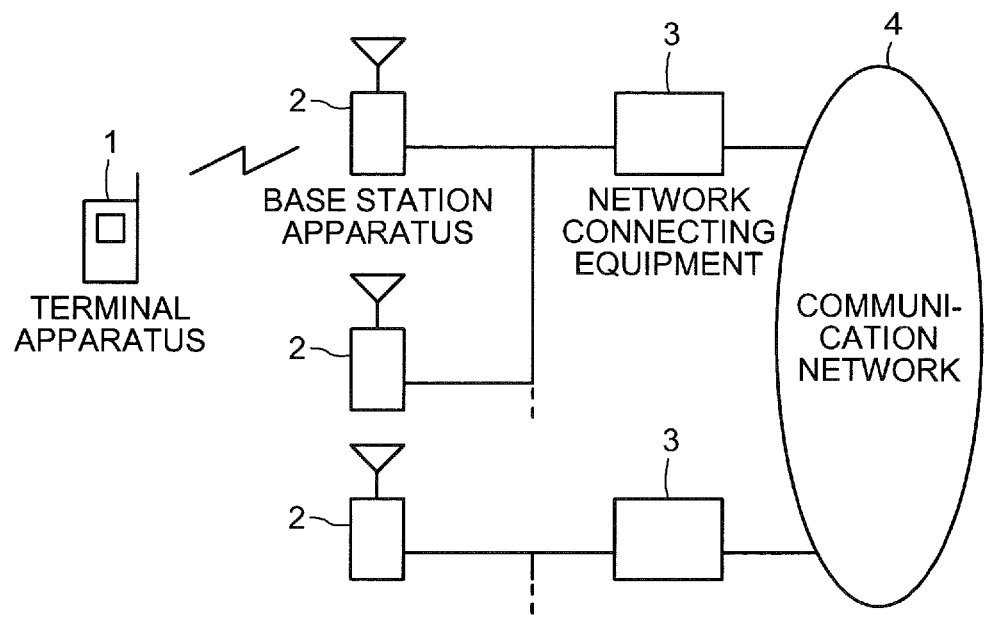
FIG. 29 is a diagram of a configuration of a mobile communication system.
Figure 30:
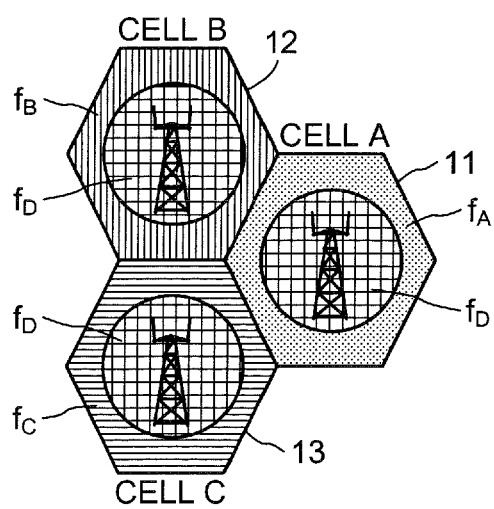
FIG. 30 is a diagram for describing a conventional frequency assignment scheme.
Figure 31:
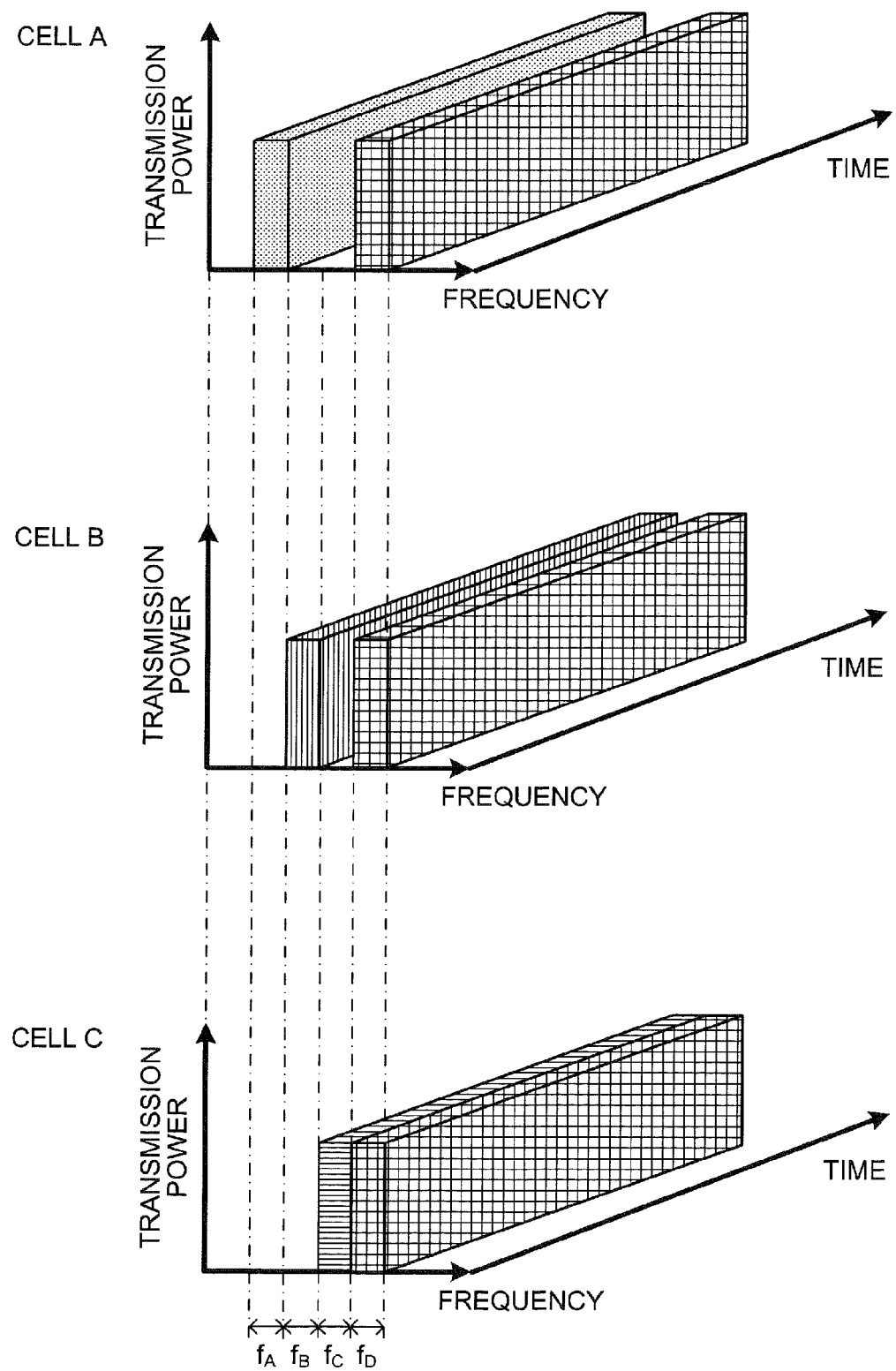
FIG. 31 is a diagram depicting the relationship of the frequency, the time, and the transmission power in each cell, etc. depicted in FIG. 30.

FIG. 28 is a diagram of a frequency and modulation and coding scheme assignment procedure of the twelfth embodiment of the wireless communication system. As depicted in FIG. 28, the base station apparatus requests the terminal apparatus to measure the wireless quality using the preamble and report the results thereof (step S91). In such measurement, the wireless quality to be measured is the wireless quality corresponding to that when the adjacent cell uses a different frequency and the wireless quality corresponding to that when the adjacent cell uses the same frequency. Alternatively, the wireless quality to be measured may be only the wireless quality corresponding to that when the adjacent cell uses the same frequency.

In response to the request from the base station apparatus, the terminal apparatus measures the corresponding wireless quality and reports the wireless quality obtained as a result to the base station apparatus (step S92). The base station apparatus then compares the wireless quality corresponding to the time slot at which the entire frequency is used, namely, the wireless quality of the preamble corresponding to the frequency assignment pattern in which the entire frequency is used, as reported from the terminal apparatus and the wireless quality required to ensure the communication quality and selects the frequency assignment pattern for communication with the terminal apparatus in the burst fields (step S93). The required wireless quality is stored in advance in the memory unit of the base station apparatus.

The base station apparatus selects, for the terminal apparatus, the modulation and coding scheme when selection is made of the frequency assignment pattern of the time slot at which the entire frequency is used, based on the wireless quality corresponding to the time slot at which the entire frequency is used (step S94). On the other hand, the base station apparatus selects, for the terminal apparatus, the modulation and coding scheme when selection is made of the frequency assignment pattern of the time slot at which the three-divided frequencies are used, based on the wireless quality corresponding to the time slot at which the three-divided frequencies are used or the wireless quality conjectured from the wireless quality corresponding to the time slot at which the entire frequency is used (step S94).

The selection of the frequency assignment pattern and the modulation and coding scheme for each terminal apparatus may be made based on the expected transmission speed per terminal apparatus for each frequency assignment pattern or the number of the terminal apparatuses sharing each frequency assignment pattern, etc., in addition to the wireless quality at the terminal apparatus. The base station apparatus, referring to the selected frequency assignment pattern and modulation and coding scheme, assigns the frequency assignment pattern and the modulation and coding scheme for communication with the terminal apparatus in the burst fields (step S95). The frequency assignment pattern is expressed as an area composed of a time axis and a frequency axis. Once the assignment of the frequency assignment pattern and the modulation and coding scheme is finished, the base station apparatus and the terminal apparatus communicate with each other in the assigned frequency assignment pattern and modulation and coding scheme (step S96).

According to each embodiment described above, since the use of a frequency different from that of adjacent cells, etc., at the time slot $t_1$ of the frequency assignment pattern 1 using the divided frequencies prevents interference for a terminal apparatus located at the border of the cell, etc., communication may be realized by all terminal apparatuses in the cell, etc. Since the use of the same frequency by all cells, etc., at the time slot $t_2$ of the frequency assignment pattern 2 using the entire frequency improves the frequency utilization efficiency, the transmission speed per terminal apparatus may be improved for terminal apparatuses located at the center of the cell, etc.

There is no need for precise adjustment of the transmission power or complicated control in the communication with the terminal apparatus. When interference from the adjacent cells, etc., fluctuates due to load, etc., the wireless quality at the terminal apparatus may be improved automatically for each frequency assignment pattern. Since automatic assignment of a frequency assignment pattern having a wide frequency band to a terminal apparatus is possible without the addition of new control to the communication system, the transmission speed may be improved.

Since deletion of unnecessary frequency assignment patterns according to the fluctuation of the interference due to the load, etc., in the adjacent cells, etc., may expand the time period of the frequency assignment pattern having wide frequency band, the average frequency band per cell, etc., may be widened. When there is no interference with the adjacent cells, etc., all terminal apparatuses in the cell, etc., may use the entire frequency at all time slots.

Herein, the present invention is not limited to the embodiments described above but may be modified in a variety of manners. For example, the number of divisions of the frequency assigned to the communication system is not limited to three but may be two, four or more. The number of time slots will increase or decrease depending on the number of the frequency assignment patterns. Since an increase in the number of the divisions by dividing the frequency assigned to the communication system makes it possible to have more distance between the cells using the same frequency, interference is mitigated and the wireless quality is improved. While the above embodiments describe mainly the frequency used for the transmission from the base station, the case is the same even with respect to the frequency used for the reception at the base station or the frequencies for both transmission and reception.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
    a first base station apparatus that includes a wireless unit that
        allows all of terminal apparatuses located within an entire area of a cell of the first base station apparatus to perform transmission or reception using a first frequency at a first power level at a first time slot, and allows only terminal apparatuses located within an area that is a part of the entire area of the cell of the first base station apparatus and surrounds the first base station apparatus to perform transmission or reception using a second frequency and a third frequency at a second power level that is lower than the first power level at the first time slot; and
        allows only terminal apparatuses located within an area that is a part of the entire area of the cell of the first base station apparatus and surrounds the first base station apparatus to perform transmission or reception using the first, second, and third frequencies at the first power level at a second time slot; and
    a second base station apparatus that includes a wireless unit that
        allows all of terminal apparatuses located within an entire area of a cell of the second base station apparatus to perform transmission or reception using the second frequency at a third power level at the first time slot, and allows only terminal apparatuses located within an area that is a part of the entire area of the cell of the second base station apparatus and surrounds the second base station apparatus to perform transmission or reception using the first frequency and the third frequency at a fourth power level that is lower than the third power level at the first time slot, and allows only terminal apparatuses located within an area that is a part of the entire area of the cell of the second base station apparatus and surrounds the second base station apparatus to perform transmission or reception using the first, second, and third frequencies at the first power level at the second time slot.

2. The wireless communication system according to claim 1, wherein
    the wireless unit of the first base station apparatus performs transmission or reception using the first frequency with a first transmission power and the second frequency with a second transmission power at the first time slot and performs the transmission or the reception using both the first frequency and the second frequency with the first transmission power at the second time slot; and
    the wireless unit of the second base station apparatus performs the transmission or the reception using the first frequency with the second transmission power and the second frequency with the first transmission power at the first time slot and performs the transmission or the reception using both the first frequency and the second frequency with the first transmission power at the second time slot.

3. The wireless communication system according to claim 1, wherein the first base station apparatus or the second base station apparatus assigns, according to a receiving state of a terminal apparatus, at least any one among the first time slot and the second time slot as a communication period of the terminal apparatus.

4. A system comprising:
    a terminal apparatus comprising:
        an assignment receiving unit that receives, from a base station apparatus, assignment of at least one among a first time slot and a second time slot, and
        a control unit that administers control so that wireless communication is performed with the base station apparatus at the assigned time slot;
    a first base station apparatus that includes a wireless unit that
        allows all of terminal apparatuses located within an entire area of a cell of the first base station apparatus to perform transmission or reception using a first frequency at a first power level at the first time slot, and allows only terminal apparatuses located within an area that is a part of the entire area of the cell of the first base station apparatus and surrounds the first base station apparatus to perform transmission or reception using a second frequency and a third frequency at a second power level that is lower than the first power level at the first time slot, and
        allows only terminal apparatuses located within an area that is a part of the entire area of the cell of the first base station apparatus and surrounds the first base station apparatus to perform transmission or reception using the first, second, and third frequencies at the first power level; and
    a second base station apparatus that includes a wireless unit that
        allows all of terminal apparatuses located within an entire area of a cell of the second base station apparatus to perform transmission or reception using the second frequency at a third power level at the first time slot, and allows only terminal apparatuses located within an area that is a part of the entire area of the cell of the second base station apparatus and surrounds the second base station apparatus to perform transmission or reception using the first frequency and the third frequency at a fourth power level that is lower than the third power level at the first time slot, and allows only terminal apparatuses located within an area that is a part of the entire area of the cell of the second base station apparatus and surrounds the second base station apparatus to perform transmission or reception using the first, second, and third frequencies at the first power level at the second time slot.

5. A wireless communication system comprising:
a terminal apparatus; and
a base station apparatus that includes:
a frequency assignment switching unit that assigns a frequency assignment pattern to a cell; and
a control unit that, according to wireless quality at the time of communicating with the terminal apparatus, selects and assigns the frequency assignment pattern to be used for communication with the terminal apparatus, wherein
the wireless communication system administers communication between the base station apparatus and the terminal apparatus by repeating a first time slot of one or more frequency assignment patterns in which an entire frequency range assigned to the wireless communication system is divided into plural frequencies and adjacent cells use a different respective frequency at a first power level and which allows all of terminal apparatuses located within an entire area of each cell to perform transmission or reception using said different respective frequency and each cell uses the different respective frequencies of adjacent cells at a second power level that is less than the first power level, and a second time slot of a frequency assignment pattern in which the adjacent cells respectively use the entire frequency range, and which allows only terminal apparatuses located within an area that is a part of the entire area of the cell to perform transmission or reception using the entire frequency range at the first power level.

6. The wireless communication system according to claim 5, wherein
the terminal apparatus includes a measuring unit that measures, in a downlink, the wireless quality of a signal received for each frequency assignment pattern from the base station apparatus, and reports the wireless qualities obtained by the measuring unit to the base station apparatus, and
the base station apparatus, by receiving the reported wireless qualities, collects the wireless quality at the terminal apparatus, for each frequency assignment pattern.

7. The wireless communication system according to claim 5, wherein
the terminal apparatus includes a measuring unit that measures, in a downlink, the wireless quality of a signal received for a given frequency assignment pattern from the base station apparatus, the terminal apparatus reporting the measured wireless quality to the base station apparatus,
the base station apparatus includes an estimating unit that, based on the reported wireless quality and for each frequency assignment pattern, calculates the wireless quality at the terminal apparatus to collect, for each frequency assignment pattern, the wireless quality at the terminal apparatus.

8. The wireless communication system according to claim 5, wherein the terminal apparatus includes:
a measuring unit that measures, in a downlink, the wireless quality of a signal received for a given frequency assignment pattern from the base station apparatus, and an estimating unit that, based on the measured wireless quality, calculates the wireless quality for each frequency assignment pattern, the terminal apparatus reports, to the base station apparatus, the wireless quality obtained by the measuring unit and each wireless quality calculated by the estimating unit, and the base station apparatus, by receiving the wireless qualities reported by the terminal apparatus, collects the wireless quality at the terminal apparatus, for each frequency assignment pattern.

9. The wireless communication system according to claim 5, wherein
the base station apparatus includes a speed calculating unit that calculates an expected transmission speed per terminal apparatus for each frequency assignment pattern, and
the base station apparatus selects and assigns the frequency assignment pattern to be used for the communication with the terminal apparatus, based on the wireless quality at the terminal apparatus for each frequency assignment pattern and the expected transmission speed obtained by the speed calculating unit for each frequency assignment pattern.

10. The wireless communication system according to claim 5, wherein
the base station apparatus includes a counting unit that counts, for each frequency assignment pattern, a quantity of terminal apparatuses to which the frequency assignment pattern is assignable by the control unit, and
the base station apparatus selects and assigns the frequency assignment pattern to be used for the communication with the terminal apparatus, based on the wireless quality at the terminal apparatus for each frequency assignment pattern and the quantity of terminal apparatuses sharing each frequency assignment pattern.

11. The wireless communication system according to claim 5, wherein
the terminal apparatus includes a frequency selecting unit that, based on the wireless quality at the terminal apparatus for each frequency assignment pattern, selects the frequency assignment pattern for the communication with the base station apparatus,
and requests the base station apparatus to communicate in the selected frequency assignment pattern, and
the base station apparatus determines whether to use the frequency assignment pattern requested by the terminal apparatus.

12. The wireless communication system according to claim 11, wherein the terminal apparatus includes a measuring unit that measures, in a downlink, the wireless quality of a signal received for each frequency assignment pattern from the base station apparatus, and via the measuring unit, collects the wireless quality at the terminal apparatus, for each frequency assignment pattern.

13. The wireless communication system according to claim 7, wherein the
terminal apparatus includes:
a measuring unit that measures, in the downlink, the wireless quality of a signal received for a given frequency assignment pattern from the base station apparatus, and
an estimating unit that, based on the measured wireless quality, calculates the wireless quality for each frequency assignment pattern, and the terminal apparatus, via the measuring unit and the estimating unit, collects the wireless quality at the terminal apparatus, for each frequency assignment pattern.

14. The wireless communication system according to claim 5, wherein the base station apparatus includes a counting unit that counts the number of times each frequency assignment pattern is selected, and the frequency assignment switching unit changes the time slots of frequency assignment patterns, based on the number of times each frequency assignment pattern is selected.

\* \* \* \* \*